(12) United States Patent
Wahaj Arshad et al.

(10) Patent No.: US 11,882,473 B2
(45) Date of Patent: Jan. 23, 2024

(54) RAN INITIATED DATA COLLECTION

(71) Applicant: Telefonaktiebolaget LM Ericsson (publ), Stockholm (SE)

(72) Inventors: Malik Wahaj Arshad, Upplands Väsby (SE); Pradeepa Ramachandra, Linköping (SE); Pablo Soldati, Solna (SE); Wei Shen, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 365 days.

(21) Appl. No.: 17/429,714

(22) PCT Filed: Feb. 11, 2020

(86) PCT No.: PCT/SE2020/050140
§ 371 (c)(1),
(2) Date: Aug. 10, 2021

(87) PCT Pub. No.: WO2020/167223
PCT Pub. Date: Aug. 20, 2020

(65) Prior Publication Data
US 2022/0104055 A1     Mar. 31, 2022

Related U.S. Application Data

(60) Provisional application No. 62/805,408, filed on Feb. 14, 2019.

(51) Int. Cl.
*H04W 24/10* (2009.01)
*H04W 24/02* (2009.01)
*H04W 24/08* (2009.01)
*H04L 5/00* (2006.01)

(52) U.S. Cl.
CPC .......... *H04W 24/10* (2013.01); *H04L 5/0055* (2013.01); *H04L 5/0069* (2013.01)

(58) Field of Classification Search
CPC ..... H04W 24/10; H04W 24/02; H04W 24/08; H04L 5/0055; H04L 5/0069
See application file for complete search history.

(56) References Cited

U.S. PATENT DOCUMENTS 8,971,848 B2 * 3/2015 Racz ..................... H04W 24/10
455/39
9,510,203 B2 * 11/2016 Jactat .................. H04W 12/084
(Continued)

FOREIGN PATENT DOCUMENTS

EP   2541977 A1   1/2013
EP   3301953 A1   4/2018
(Continued)

OTHER PUBLICATIONS

International Search Report and Written Opinion dated May 18, 2020 for International Application No. PCT/SE2020/050140 filed Feb. 11, 2020, consisting of 13—pages.
(Continued)

*Primary Examiner* — Ahmed Elallam
(74) *Attorney, Agent, or Firm* — Christopher & Weisberg, P.A.

(57) ABSTRACT

According to certain embodiments, a method performed by a Radio Access Network, RAN, node includes transmitting a data collection request to a network control entity. The data collection request indicates a request to start data collection within a Radio Access Network, RAN. The method includes receiving a data collection response from the network control entity. The data collection response indicates whether the RAN can start the data collection procedure. In response to the data collection response indicating that the RAN can start the data collection procedure, the method includes transmitting a data collection configuration message initializing data collection by at least one User Equipment, UE.

20 Claims, 16 Drawing Sheets

(56) References Cited

U.S. PATENT DOCUMENTS

| | | | | |
|---|---|---|---|---|
| 9,888,403 B2* | 2/2018 | Xu | ............... | H04W 24/10 |
| 10,616,784 B2* | 4/2020 | Andrianov | ............ | H04W 24/10 |
| 11,564,198 B2* | 1/2023 | Siomina | ................ | G01S 5/0236 |
| 2012/0315949 A1* | 12/2012 | Zhang | ................... | H04W 24/08 |
| | | | | 455/517 |
| 2013/0053017 A1* | 2/2013 | Chang | ................... | H04L 5/0048 |
| | | | | 455/67.11 |
| 2014/0155056 A1* | 6/2014 | Jactat | ................... | H04W 16/18 |
| | | | | 455/422.1 |
| 2018/0035321 A1* | 2/2018 | Zhang | ................... | H04W 24/08 |
| 2020/0374736 A1* | 11/2020 | Fukuta | ................... | H04W 24/08 |
| 2022/0104050 A1* | 3/2022 | Liu | ................... | H04W 24/10 |

FOREIGN PATENT DOCUMENTS

| | | | |
|---|---|---|---|
| WO | 2013021832 | A1 | 2/2013 |
| WO | 2016012053 | A1 | 1/2016 |
| WO | WO-2018184667 | A1 * | 10/2018 |

OTHER PUBLICATIONS

3GPP TSG-RAN WG3 Meeting #101bis R3-186039; Title: Considerations on support of MDT in NR; Agenda Item: 25.2.1; Source: CMCC; Document for: Discussion and Decision; Date and Location: Oct. 8-12, 2018, Chengdu, China, consisting of 3—pages.

SA WG2 Meeting #128Bis S2-188463 Revision of S2-188067; Title: Solution of Key issue 13: Trace based solution to collect UE related information in NWDAF; Agenda Item: 6.11; Source: Qualcomm Incorporated; Document for: Discussion/Approval; Work Item/Release: FS_eNA/Rel-16; Date and Location: Aug. 20-24, 2018, Sophia Antipolis, France, consisting of 3—pages.

ETSI TS 137 320 V15.0.0; Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2 (3GPP TS 37.320 version 15.0.0 Release 15); Jul. 2018, consisting of 29—pages.

* cited by examiner

RAN INITIATED DATA COLLECTION

CROSS-REFERENCE TO RELATED APPLICATIONS

This application is a Submission Under 35 U.S.C. § 371 for U.S. National Stage Patent Application of International Application No.: PCT/SE2020/050140, filed Feb. 11, 2020 entitled "RAN INITIATED DATA COLLECTION," which claims priority to U.S. Provisional Application No. 62/805, 408, filed Feb. 14, 2019, entitled "RAN INITIATED DATA COLLECTION," the entireties of both of which are incorporated herein by reference.

BACKGROUND

Minimization of Drive Test (MDT) is a feature introduced in Long Term Evolution (LTE) Release 10 (Rel-10) to enable network operators to collect radio measurements for network planning and (re-)configuration directly from user equipment (UE).

Depending on the connectivity status of the UE, LTE distinguishes between two modes for collecting measurements with MDT:
1. Logged MDT: configured for UEs in RRC_IDLE mode;
2. Immediate MDT: configured for UEs in RRC_CONNECTED mode.

Because a UE in RRC_IDLE mode a does not have a connection with a serving base station, a UE configured for logged MDT stores measurements locally until it transitions to an RRC_CONNECTED mode. Upon moving to RRC_CONNECTED mode, the UE indicates the availability of MDT reporting to the network. The network node (e.g., Evolved NodeB (eNB)) can then instruct the UE to report the logged measurements and report it to the Trace Entity.

A UE in RRC_CONNECTED state can be configured with immediate MDT to report all measurements immediately, without requiring a logging function.

Type of MDT Measurements

Logged MDT is used to collect Reference Signal Received Power (RSRP) and/or Reference Signal Received Quality (RSRQ) measurements from UEs in RRC_IDLE mode. By contrast, immediate MDT is performed only for Radio Resource Control (RRC) connected UEs. LTE MDT measurements are tagged with a time and, depending on user consent and availability of geo-location capabilities of the UE, location.

Support for collecting measurements M1~M9 in LTE MDT are described in the Third Generation Partnership Project (3GPP) Technical Specification (TS) 37.320. Also, LTE introduces accessibility and Multimedia Broadcast multicast service Single Frequency Network (MBSFN), Wide Local Area Network (WLAN)/Bluetooth related measurements in after Release.

Currently, LTE MDT immediate mode defines nine measure modes:
M1: RSRP and RSRQ measurement by UE.
M2: Power Headroom measurement by UE.
M3: Received Interference Power measurement by eNB. This is a cell measurement.
M4: Data Volume measurement separately for downlink (DL) and uplink (UL), per Quality of Service (QoS) Class Identifier (QCI) per UE, by eNB.
M5: Scheduled Internet Protocol (IP) Throughput for MDT measurement separately for DL and UL, per Radio Access Bearer (RAB) per UE and per UE for the DL, per UE for the UL, by eNB. QCI values of the RABs that have contributed to a measurement value are logged with the measurement values.
M6: Packet Delay measurement, separately for DL and UL, per QCI per UE, see UL PDCP Delay, by the UE, and Packet Delay in the DL per QCI, by the eNB.
M7: Packet Loss rate measurement, separately for DL and UL per QCI per UE, by the eNB.
M8: RSSI measurement by UE.
M9: RTT measurement by UE.
Modes M1, M2, M8, and M9 are measured by the UE.
Modes M3 to M7 are measured by the eNB.

MDT Configuration

In LTE, MDT is triggered by a trace procedure. The existing trace signalling-based MDT enables Operations, Administration and Management (OAM) or Core Network (CN) to collect MDT data. The operator can perform network maintenance based on the collected data.

In LTE, the MDT signalling is embedded into existing trace procedures. Consequently, there are two kinds of MDT tasks: 1) a management-based trace procedure (i.e., cell traffic trace) in which the MDT task is initiated towards cells, and 2) an MDT task that is initiated towards a specific UE by the signalling trace activation messages from CN node. These two kinds of MDT tasks can be reused in a Next Generation-Radio Access Network (NG-RAN) MDT. Both management-based MDT and signalling-based MDT are initiated by OAM because the current use cases of MDT (coverage hole detection, QoS verification, etc.) are located in OAM.

SUMMARY

Existing LTE MDT procedures may present certain challenges. As described above, existing LTE MDT procedures use a trace procedure to trigger MDT. However, the existing trace signalling-based MDT procedure is not so effective in some cases. For example, network maintenance relying on trace signalling-based MDT involves a time consuming that consists of the following three steps: 1) OAM or CN sends MDT collection signalling to eNB; 2) eNB collects measurement results and delivers them to OAM or CN; 3) network maintenance staff performs network adjustment according to the measurements. Another challenge associated with the existing trace signalling-based MDT procedure is that the Radio Access Network (RAN) cannot initiate the MDT collection whenever it is needed. Rather, the RAN performs the measurement collection only after OAM or CN initiates trace signalling. This kind of restriction limits the RAN's ability to perform a fast network self-optimization function.

Certain aspects of the present disclosure and their embodiments may provide solutions to challenges presented by existing LTE MDT procedures. As an example, certain aspects of the present disclosure may provide solutions to challenges presented by existing LTE MDT procedures that configure an MDT trace at the OAM level. As another example, certain aspects of the present disclosure may provide solutions to challenges presented by existing LTE MDT procedures in which all MDT traces collected from the UE in the RAN are forwarded to the OAM and are, thus, outside the RAN. As such, the RAN node cannot utilize these traces for internal self-organizing (or self-optimizing) network (SON) functions/optimizations.

The present disclosure proposes various solutions to the above-described challenges. For example, according to certain embodiments, a method is provided for requesting data collection initialization by the RAN node. The RAN node may include, for example, an eNB, gNB (the base station in New Radio (NR)), next generation eNB (ng-eNB), or data collection node.

According to certain embodiments, the method, which is executed by a RAN node within RAN, includes:

Transmitting a data collection request message from a network node (RAN node) to a network control entity for starting data collection within the RAN.

Receiving a response from the network control entity. Examples of options for the response include:
Option 1: data collection response indicator+data collection configuration;
Option 2: only data collection response indicator;
Option 3: only data collection configuration;
wherein, in certain embodiments, the data collection response indicator consists of either an ACK or a NACK. In certain embodiments, the data collection configuration may comprise a legacy MDT configuration.

Configuring the corresponding UE(s) for data collection based on the data collection response message. For example:
With respect to options 1 and 3 above, the network node may configure the UE to use the data collection configuration that the network node received in the response from the network control entity.
With respect to option 2 above, the network node may configure the UE to use a data collection configuration determined by the network node. For example, once the network node has determined the data collection configuration, the network node may send a request message requesting the network control entity to accept the data collection configuration proposed by the network node. If the response from the network control entity comprises an ACK, the network node can proceed with configuring the UE according to the data collection configuration proposed by the network node.

Reporting the collected data based on the data collection configuration (e.g., the network node may receive a data collection report from the UE and may optionally communicate the data collection report to the network control entity).

According to certain embodiments, the RAN can initiate an MDT procedure to collect measurement results that are utilized by the RAN to perform fast radio resource management (RRM) and SON.

According to certain embodiments, a method performed by a RAN node comprises transmitting a data collection request to a network control entity. The data collection request indicates a request to start data collection within a RAN. The method comprises receiving a data collection response from the network control entity. The data collection response indicates whether the RAN can start the data collection procedure. In response to the data collection response indicating that the RAN can start the data collection procedure, the method comprises transmitting a data collection configuration message initializing data collection by at least one UE.

According to certain embodiments, a RAN node comprises power supply circuitry and processing circuitry. The power supply circuitry is configured to supply power to the RAN node. The processing circuitry is configured to transmit a data collection request to a network control entity. The data collection request indicates a request to start data collection within a RAN. The processing circuitry is configured to receive a data collection response from the network control entity. The data collection response indicates whether the RAN can start the data collection procedure. In response to the data collection response indicating that the RAN can start the data collection procedure, the processing circuitry is configured to transmit a data collection configuration message initializing data collection by at least one UE.

According to certain embodiments, a computer program comprises instructions that, when executed by a RAN node, cause the RAN node to perform steps comprising transmitting to a network control entity a data collection request indicating a request to start data collection within a RAN, receiving from the network control entity a data collection response indicating whether the RAN can start the data collection procedure, and transmitting a data collection configuration message initializing data collection by at least one UE in response to the data collection response indicating that the RAN can start the data collection procedure.

The above-described method, RAN node, and/or computer program may include one or more additional features, such as one or more of the following:

In certain embodiments, the data collection response received from the network control entity comprises one of an ACK or a NACK. The ACK indicates that the RAN can start the data collection procedure. The NACK indicates that the RAN cannot start the data collection procedure.

In certain embodiments, the data collection configuration message that initializes data collection by the at least one UE is an MDT configuration message.

In certain embodiments, the data collection configuration message that initializes data collection by the at least one UE comprises a data collection configuration.

In certain embodiments, a data collection report is received from the at least one UE. An internal operation of the RAN may be performed based on information received in the data collection report. The data collection report may be forwarded to the network control entity.

In certain embodiments, the data collection request includes a request for the network control entity to provide a data collection configuration. In certain embodiments, a data collection configuration is received from the network control entity, for example, in the data collection response. In other embodiments, the data collection response comprises an Acknowledgement, ACK, and a data collection configuration, the data collection configuration received via dedicated signaling from the network control entity to the RAN node.

Certain embodiments determine one or more data collection preferences of the RAN node. Each data collection preference comprises a configuration requirement and/or a parameter configuration that the RAN node prefers to use for the data collection within the RAN. The one or more data collection preferences are included in the data collection request.

In certain embodiments, the one or more data collection preferences comprise one or more of a specific UE, a group of UEs, or a type of UE for which the RAN node requests to configure data collection; a specific UE, a group of UEs, or a type of UE for which the RAN node requests UE consent for configuring data collection; one or more geographical areas for which the radio network node requests to configure data collection; a starting time, duration, periodicity, and/or repetition pattern of data collection; and/or one or more types of measurements to be collected. In certain embodiments, the data collection response received from the network control entity comprises a data collection configuration based on the one or more data collection preferences that were included in the data collection request.

Certain embodiments determine a data collection configuration that the RAN node prefers to use for the data collection within the RAN. The data collection request indicates the data collection configuration that the RAN node prefers to use for the data collection within the RAN. In certain embodiments, the data collection response comprises an ACK indicating that the RAN node can start the data collection procedure according to the data collection configuration indicated in the data collection request. In other embodiments, the data collection response comprises a new or modified data collection configuration indicating that the RAN node can start the data collection procedure according to the new or modified data collection configuration. In some embodiments, the data collection response comprises a NACK indicating that the network control entity has rejected the data collection configuration indicated in the data collection request.

In certain embodiments, the data collection request indicates a request to start the data collection procedure at a second RAN node.

In certain embodiments, the data collection configuration message initializes data collection by the at least one UE according to the data collection configuration received from or acknowledged by the network control entity.

In certain embodiments, the data collection configuration comprises one or more of: a starting time for data collection; an ending time for data collection; a time window for radio measurements; a periodicity for radio measurements for data collection; a condition for starting or terminating data collection; and/or one or more types of measurements to be collected.

In certain embodiments, the data collection response includes a data collection configuration but does not include any ACK or NACK indicator.

In certain embodiments, the data collection response includes an ACK or NACK indicator but does not include any data collection configuration.

In certain embodiments, the data collection response comprises both an ACK or NACK indicator and a data collection configuration.

According to certain embodiments, a method performed by a network control entity comprises receiving a data collection request from a RAN node. The data collection request indicates a request to start data collection within a RAN. The method comprises determining whether the RAN can start the data collection procedure and transmitting a data collection response from the network control entity to the RAN node. The data collection response indicates whether the RAN can start the data collection procedure.

According to certain embodiments, a network control entity comprises power supply circuitry and processing circuitry. The power supply circuitry is configured to supply power to the network control entity. The processing circuitry is configured to receive a data collection request from a RAN node. The data collection request indicates a request to start data collection within a RAN. The processing circuitry is configured to determine whether the RAN can start the data collection procedure. The processing circuitry is also configured to transmit a data collection response from the network control entity to the RAN node. The data collection response indicates whether the RAN can start the data collection procedure.

According to certain embodiments, a computer program comprises instructions that, when executed by a network control entity, cause the network control entity to perform steps comprising receiving, from a RAN node, a data collection request indicating a request to start data collection within a RAN; determining whether the RAN can start the data collection procedure; and transmitting, from the network control entity to the RAN node, a data collection response indicating whether the RAN can start the data collection procedure.

The above-described method, RAN node, and/or computer program may include one or more additional features, such as one or more of the following:

In certain embodiments, the data collection response comprises one of an ACK or a NACK. The ACK indicates that the RAN can start the data collection procedure. The NACK indicates that the RAN cannot start the data collection procedure.

In certain embodiments, an operation of the network control entity is performed based on information from at least one UE performing the data collection procedure, the information received via a data collection report that has been forwarded to the network control entity by the RAN node.

In certain embodiments, the data collection request received from the RAN node comprises a request for the network control entity to provide a data collection configuration. A data collection configuration is determined and provided to the RAN node. In certain embodiments, the data collection configuration is provided in the data collection response to the RAN node. In other embodiments, the data collection response comprises an Acknowledgement, ACK, and a data collection configuration, the data collection configuration transmitted via dedicated signaling from the network control entity to the RAN node.

Certain embodiments receive one or more data collection preferences of the RAN node. The one or more data collection preferences of the RAN node are received in the data collection request, and each data collection preference comprises a configuration requirement and/or a parameter configuration that the RAN node prefers to use for the data collection within the RAN. A data collection configuration is determined based on the one or more data collection preferences that were received in the data collection request, and the data collection configuration is provided to the RAN node.

In certain embodiments, the one or more data collection preferences comprise one or more of: a specific UE, a group of UEs, or a type of UE for which the RAN node requests to configure data collection; a specific UE, a group of UEs, or a type of UE for which the RAN node requests UE consent for configuring data collection; one or more geographical areas for which the radio network node requests to configure data collection; a starting time, duration, periodicity, and/or repetition pattern of data collection; and/or one or more types of measurements to be collected.

In certain embodiments, the data collection request indicates a data collection configuration that the RAN node prefers to use for the data collection within the RAN. A determination is made whether to accept the data collection configuration that the RAN node prefers to use for the data collection within the RAN. For example, in response to determining to accept the data collection configuration that the RAN node prefers to use for the data collection within the RAN, an ACK can be included in the data collection response. The ACK indicates that the RAN node can start the data collection procedure according to the data collection configuration indicated in the data collection request. As another example, in response to determining not to accept the data collection configuration that the RAN node prefers to use for the data collection within the RAN, a new or modified data collection configuration can be included in the data collection response. The new or modified data collection configuration indicates that the RAN node can start the data collection procedure according to the new or modified data collection configuration. As another example, in response to determining not to accept the data collection configuration that the RAN node prefers to use for the data collection within the RAN, a NACK can be included in the data collection response.

In certain embodiments, the data collection request indicates a request to start the data collection at a second RAN node.

In certain embodiments, the data collection configuration comprises one or more of: a starting time for data collection; an ending time for data collection; a time window for radio measurements; a periodicity for radio measurements for data collection; a condition for starting or terminating data collection; and/or one or more types of measurements to be collected.

In certain embodiments, the data collection response includes a data collection configuration but does not include any ACK or NACK indicator.

In certain embodiments, the data collection response includes an ACK or NACK indicator but does not include any data collection configuration.

In certain embodiments, the data collection response comprises both an ACK or NACK indicator and a data collection configuration.

Certain embodiments may provide one or more of the following technical advantages. For example, one technical advantage may be that certain embodiments provide a data collection procedure, which can be configured by a network control entity based on a triggering signal from a RAN node. This has the advantage of adding flexibility to prior art solutions for data collection procedures while retaining all the advantages of maintaining the configuration at a network control entity residing outside the RAN. The RAN-triggered data collection configuration is especially useful for measurements that do not require user consent but are required for multiple RAN internal functions.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
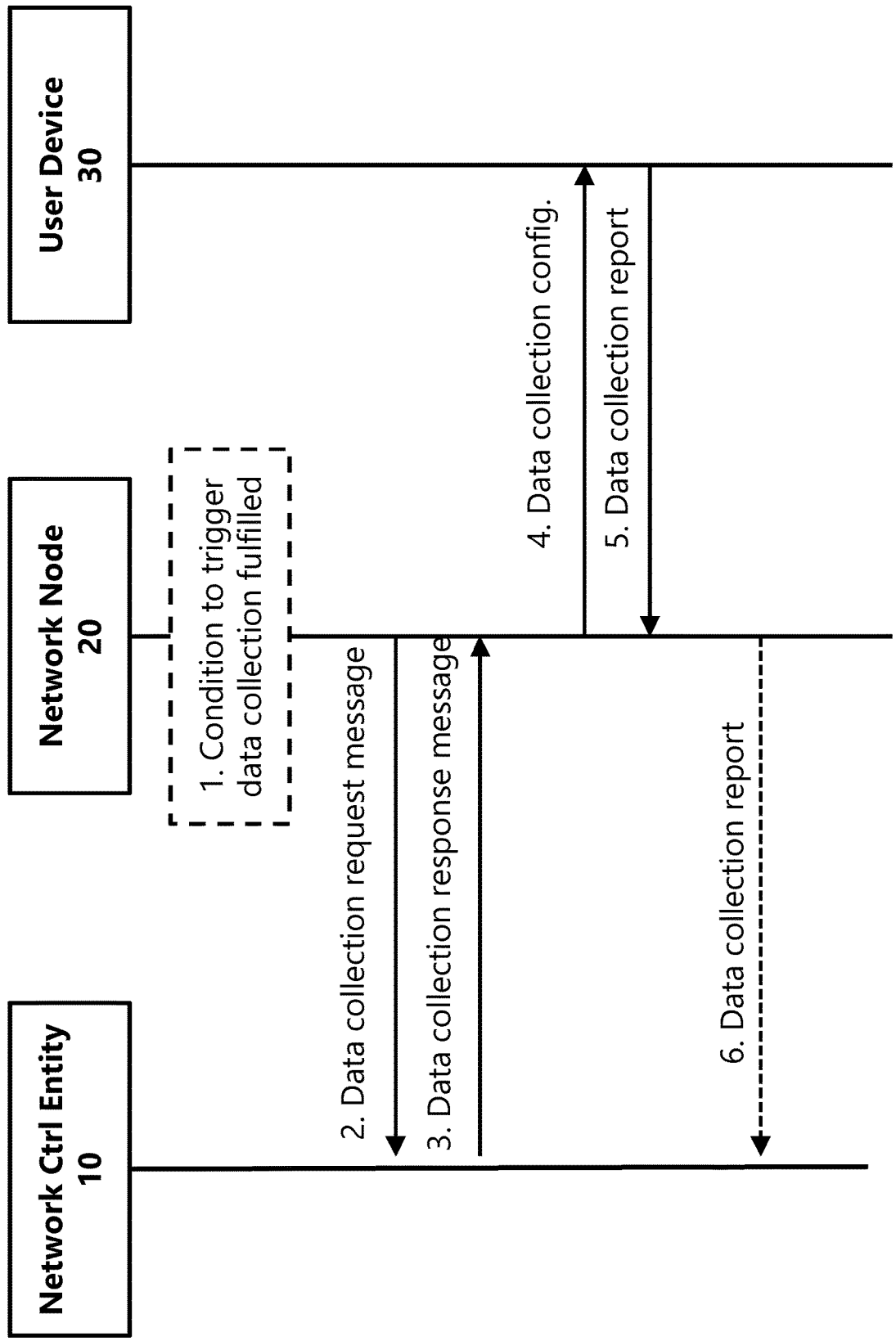
FIG. 1 illustrates an example of a signaling exchange between a RAN node and a network control entity to trigger data collection in the RAN node, in accordance with certain embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In some embodiments, a more general term "network node" may be used and may correspond to any type of radio network node or any network node, which communicates with a UE (directly or via another node) and/or with another network node. Examples of network nodes may include RAN nodes and network control entities. Examples of RAN nodes may include a NodeB, Master eNB (MeNB), eNB, a network node belonging to master cell group (MCG) or secondary cell group (SCG), base station (BS), multi-standard radio (MSR) radio node such as MSR base station (BS), eNodeB, gNodeB, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS). Examples of network control entities may include a core network node (e.g., mobile switching center (MSC), mobile management entity (MME), etc), OAM, operations and maintenance (O&M), operations support system (OSS), SON, positioning node (e.g., E-Serving Mobile Location Center (E-SMLC)), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UEs are target device, device-to-device (D2D) UE, machine type UE (e.g., MTC UE) or UE capable of machine-to-machine (M2M) communication, personal digital assistant (PDA), pad, tablet, mobile terminals, smart phone, laptop embedded equipped (LEE), laptop mounted equipment (LME), universal serial bus (USB) dongles, UE category M1, UE category M2, Proximity Services (ProSe) UE, vehicle-to-vehicle (V2V) UE, vehicle-to-x (V2X) UE, etc.

The terminologies such as base station/gNodeB and UE should be considered non-limiting and, in particular, do not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

Figure 2:
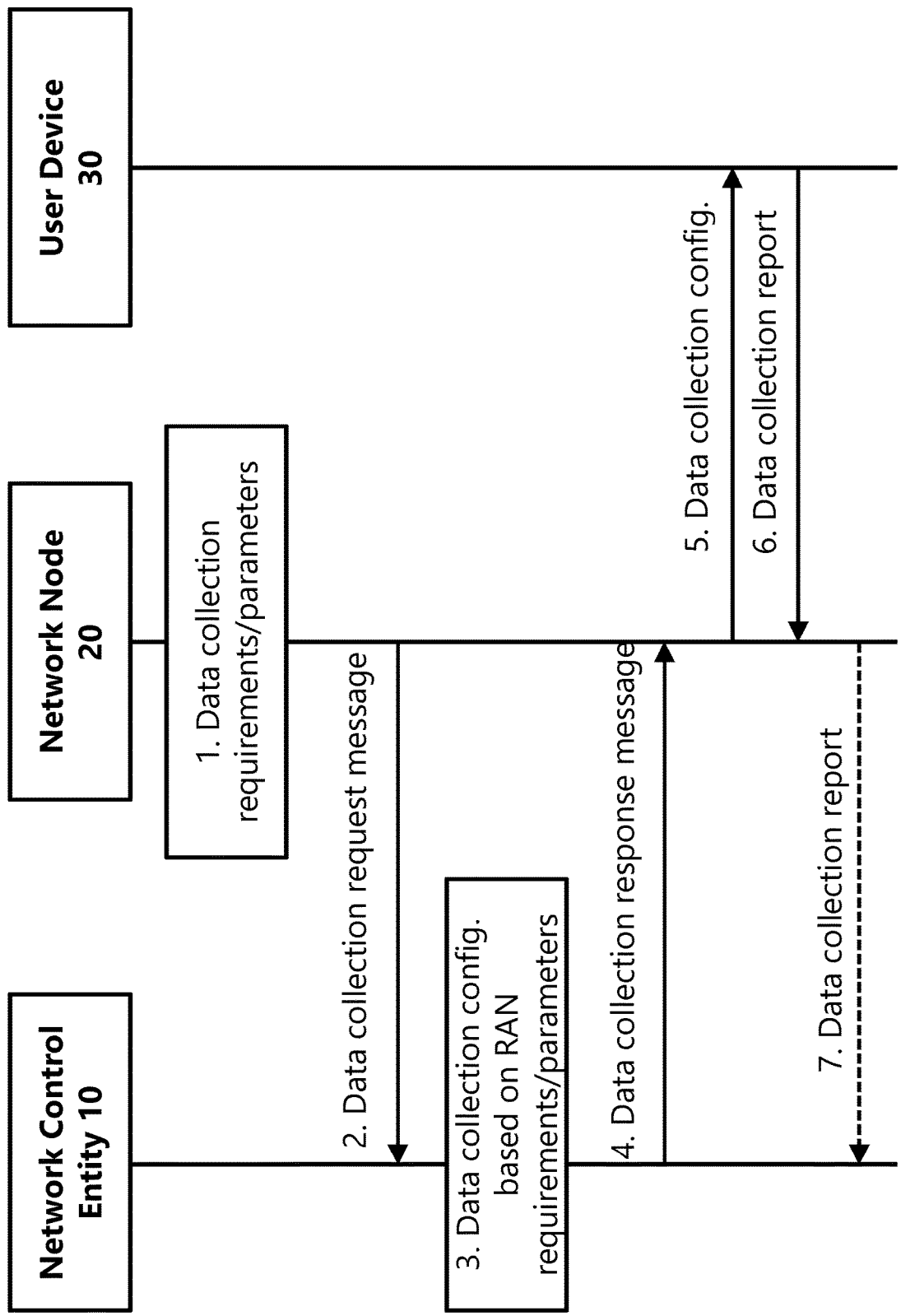
FIG. 2 illustrates an example of a signaling exchange between a RAN node and network control entity, wherein the data collection request message comprises a set of requirements/parameters for data collection determined by the RAN node, in accordance with certain embodiments.
Figure 3:
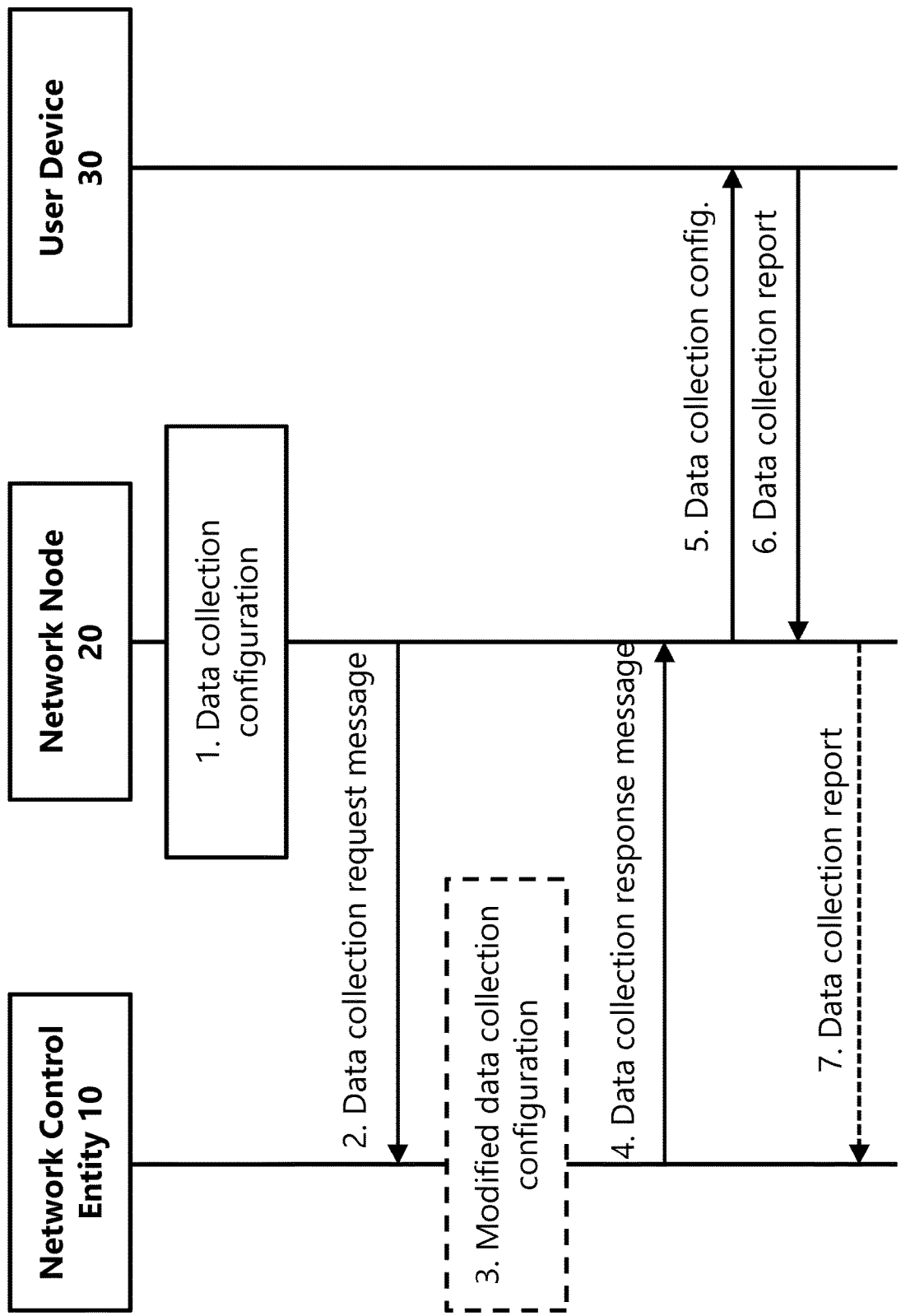
FIG. 3 illustrates an example of a signaling exchange between a RAN node and network control entity for transmitting a preferred data collection configuration to a network control entity, in accordance with certain embodiments.

FIGS. 1-3 each illustrate an example of a message flow between a network control entity 10, a RAN network node 20, and a user device 30. In general, the RAN node (a node within the RAN) requests data collection initialization. FIGS. 1-3 each illustrate examples of signaling for a RAN node to trigger a data collection function managed by a network control entity, such as an element manager (EM), access and mobility management function (AMF), MME, Management Function, operations and maintenance (O&M), operations support system (OSS), SON, or positioning node, according to certain embodiments. The RAN node may include, for example, an eNB, gNB, ng-eNB, or data collection node. Certain embodiments of the methods illustrated in FIGS. 1-3 may generally include:

Transmitting a data collection request message from a network node (RAN node) to a network control entity for starting data collection within the RAN;
Receiving a response from the network control entity. Examples of options for the response include:
Option 1: data collection response indicator+data collection configuration;
Option 2: only data collection response indicator;
Option 3: only data collection configuration;
wherein, in certain embodiments, the data collection response indicator consists of either an ACK or a NACK. In certain embodiments, the data collection configuration may comprise a legacy MDT configuration.
Configuring the corresponding UE(s) for data collection based on the data collection response message. For example:
With respect to options 1 and 3 above, the network node may configure the UE to use the data collection configuration that the network node received in the response from the network control entity.
With respect to option 2 above, the network node may configure the UE to use a data collection configuration determined by the network node. For example, once the network node has determined the data collection configuration, the network node may send a request message requesting the network control entity to accept the data collection configuration proposed by the network node. If the response from the network control entity comprises an ACK, the network node can proceed with configuring the UE according to the data collection configuration proposed by the network node.
Reporting the collected data based on the data collection configuration (e.g., the network node may receive a data collection report from the UE and may optionally communicate the data collection report to the network control entity).

In FIG. 1, the RAN node determines in step 1 whether a condition to trigger data collection has been fulfilled. Once the RAN node determines the necessity to trigger a data collection procedure within the RAN, the RAN node proceeds to step 2 with transmitting a data collection request message to a network control entity to trigger a configuration for a data collection procedure. That is, the RAN node requests the initialization or configuration of a data collection procedure managed by the network control entity. One example of a data collection procedure that is controlled by the system management entity, such as the OAM entity, is the LTE Minimization of Drive Test (MDT) procedure.

Upon receiving a data collection request message from a RAN node, the network control entity shall determine whether to configure a data collection procedure for the RAN node. A data collection response message is then transmitted from the network control entity to the RAN node in step 3. The data collection response message comprises at least either an acknowledgement (ACK) command or a negative acknowledgment (NACK) command for the RAN node, thereby indicating to the RAN node whether it can start a data collection procedure or not, respectively.

Upon receiving a data collection ACK command, in step 4, the RAN node transmits a data collection configuration message to one or more UE(s) to initialize data measurements and reporting based on the data collection acknowledgement response message. In one example, the data collection configuration message is an MDT configuration message, i.e. the data collection configuration is an MDT configuration.

The UEs configured for data collection perform and report radio measurements based on the data collection configuration message, and transmit a data collection report message to the RAN node in step 5. UEs in both RRC_CONNECTED state and RRC_IDLE state may be configured for data collection and reporting. The data collection configuration may comprise one or more of the following aspects:
A starting time for data collection
An ending time for data collection
A time window for radio measurements for data collection A periodicity for radio measurements for data collection A condition for starting or terminating data collection, for instance:

If a measure of signal quality toward a radio cell, such as Reference Signal Received Power (RSRP), Reference Signal Received Quality (RSRQ), Signal to Interference and Noise Radio (SINR), Signal to Noise Radio (SNR), etc., exceeds or falls below a given threshold.

If the battery level exceeds a given threshold.

If the number of radio cells that can be measured is above or below a given threshold.

If the estimated UE velocity (horizontal or vertical) or speed is above or below a given threshold.

If the estimated altitude of the UE is above or below a given threshold.

One or more types of measurements to be collected

Examples of types of measurements may include RSRP measurements, RSRQ measurements, SINR measurements, SNR measurements, number of cells that can be measured above or below a given threshold, battery level measurements, UE velocity measurements, UE speed measurements, UE altitude measurements, RSSI measurements, and RTT measurements.

In a particular embodiment, the network control entity may further configure the RAN node to report the to the network control entity all data collected by the RAN node. Thus, in such an embodiment, the RAN node forwards the data collection report messages to the network control node in step 6. In an LTE or NR system, this would allow the method to expose RAN measurements to network management system entities, such as an OAM entity.

In a particular embodiment, the data collection request is an Information Element (IE) which is included in an existing message such as a UE attach request.

As described above, the RAN node may transmit a data collection configuration request to network control entity. In a particular embodiment, the data collection request message comprises a request for a data collection configuration. Upon receiving the data collection request message, the network control entity can determine whether to initialize and configure the RAN node for a data collection procedure. Therefore, in one possible implementation, the data collection response message may comprise an ACK and a configuration for a data collection procedure for the RAN node. In an alternative implementation, the data collection response message may comprise only an ACK command, which shall be followed by dedicated signaling to configure the RAN node for data collection. The dedicated signaling could be, for instance, the signaling required to initialize and configure the RAN node for the MDT procedure. In an alternative embodiment, the data collection response message can comprise a NACK command when the data collection configuration for the RAN node is rejected.

According to certain embodiments, the RAN node may determine a set of parameters/requirements for data collection. More specifically, the RAN node may further determine a set of (preferred) configuration requirements or parameters for data collection. These preferred configuration parameters could (but not limited to) be generated by Self Organizing Network Functions independently or by a logical entity in the RAN that collects and analyzes the UE measurements. Thus, the data collection request message may further comprise a set of (preferred) configuration requirements/parameters for data collection. The network control entity, may therefore determine whether to initialize a data collection procedure or a data collection configuration setup based on the received (preferred) configuration requirements/parameters for data collection.

FIG. 2 illustrates an example signaling exchange between a RAN node and network control entity for one possible implementation of the method, wherein the data collection request message further comprises a set of requirements/parameters for data collection determined by the RAN node. As depicted, the method may further comprise the steps of:

Step 1: determining a set of requirements/parameters for data collection, including one or more of the following components:

a specific UE, a group of UE or type of UEs that the RAN node wants to configure data collection to;

may include a request to get UE consent, the area that the radio network node wants to configure data collection, where an area can be defined in terms of coverage area of downlink;

staring time, duration, periodicity, repetition pattern of data collection;

Step 2: transmitting to a network control entity a request message for starting data collection comprising a set of (preferred) requirements/parameters for configuring data collection;

Step 3: determining a data collection configuration at the network control entity based on the RAN requirements/parameters received from the network node in step 2;

Step 4: receiving a data collection response message from the network control entity at the network node;

Step 5: transmitting a data collection configuration from the network node to the UE;

Step 6: receiving a data collection report from the UE at the network node;

Step 7: in certain embodiments, transmitting the data collection report from the network node to the network control entity.

According to certain embodiments, the set of (preferred) requirements/parameters for data collection transmitted in step 2 of FIG. 2 may comprise one or more of:

A list of at least one UE for which the RAN node would like to configure data collection. For instance, such list could comprise UEs in RRC_COONECTED mode or UEs in RRC_IDLE mode.

A list of at least one UE for which the RAN node would like to acquire UE consent for configuring data collection, e.g., consent to use geolocation information, such as GPS location.

The type of UEs for which the RAN node would like to configure data collection. For instance, UEs fulfilling certain capabilities, UEs transmitting or receiving a certain type of traffic (such as V2X, ultra-reliable low latency communication (URLLC), mobile broadband (MBB), etc.), UEs registered for a certain network slice, UEs fulfilling certain mobility criteria (e.g., with speed below or above a given threshold).

One or more geographical areas within the RAN node coverage area wherein the RAN node has determined that more data should be collected, wherein an area can be defined in terms of coverage area of downlink reference signals such as the cell-specific reference signal (CRS), the demodulation reference signal (DM-RS), the channel state information reference signals (CSI-RS), the Synchronization Signal and Physical Broadcast Channel (PBCH) Block (SSB) for the 3GPP NR system, etc.

A preferred time configuration for data collection. For instance, a staring time for data collection, a duration of data collection, a periodicity with which a data collection configuration can be repeated by the RAN node without any additional configuration command from the network control entity (this may be implemented, for instance, by a repetition pattern of data collection, a radio measurement configuration for data collection, etc.).

One or more types of measurements to be collected. Examples of types of measurements may include RSRP measurements, RSRQ measurements, SINR measurements, SNR measurements, number of cells that can be measured above or below a given threshold, battery level measurements, UE velocity measurements, UE speed measurements, UE altitude measurements, RSSI measurements, and RTT measurements.

According to certain embodiments, the RAN node may transmit a preferred data collection configuration to network control entity. More specifically, the RAN node may determine a preferred data collection configuration and transmit to a network control entity a request message for data collection comprising the preferred data collection configuration. FIG. 3 illustrates the signaling exchange between a RAN node and network control entity for transmitting the preferred data collection configuration to a network control entity. As depicted, the method of FIG. 3 includes the steps of:

determining a data collection configuration (step 1)
transmitting to a network control entity a request message for data collection, the request message comprising the data collection configuration (step 2)

The network control entity may determine whether to modify the data collection configuration in step 3. In step 4, the network control entity sends the network node a data collection response message. In certain embodiments, the data collection response comprises an MDT acknowledgement message that can either consist of a simple ACK/NACK indicating whether the network control entity approved or rejected the MDT configuration that the network control entity received from the network node in step 2, or a modified MDT configuration. In step 5, the network node transmits the data collection configuration to the UE. The UE collects the data based on the data collection configuration and transmits a data collection report to the network node in step 6. In certain embodiments, the network node transmits the data collection report to the network control entity (step 7).

In another embodiment, the RAN node may transmit a policy based on a RAN internal function requirement, towards the network control element and the network control element responds by mapping the policy to the data collection response message and sending it back towards RAN node. The network control entity may have the capacity to preconfigure or dynamically map the RAN triggered policy to the data collection response message. In another embodiment, network control entity provides insights relevant to the policy request from the RAN node along with the data collection response, i.e., for a policy to reduce latency, the network control entity can provide statistics identifying UE types that have the capacity to efficiently use network resources for minimizing latency or identifying UE types that have proven to effectively utilize functions like short transmission time interval (TTI) in other cells of the network. Another example of insight could be to highlight UEs that report support for functions in UE capability but were not able to perform when configured with latency reduction features.

In one exemplifying example, the (preferred) data collection configuration could be determined based on an existing data collection configuration used by the RAN node. In this case, the RAN node may determine a modification to the data collection procedure, such as type of measurements to be configured for UEs and to be reported, timing of data measurements (e.g., starting time, duration of measurements, periodicity, etc.), target UEs to be used for measurements, type of area to be used for measurements, etc.

In this case, upon receiving a data collection request message, the network control entity can:

Determine whether to acknowledge the (preferred) data collection configuration received from the RAN node without any modification. In this case, the network control entity transmits a data collection response message to the RAN node comprising an ACK command associated to the data collection configuration suggested by the RAN node.

Determine a modified (or a new) data collection configuration for the RAN node and transmit a data collection response message to the RAN node comprising an ACK command to start data collection and the modified (or new) data collection configuration.

Determine to not acknowledge the data collection configuration. In this case, the network control entity transmits a data collection response message to the RAN node comprising a NACK command associated to the data collection configuration suggested by the RAN node.

Therefore, in one possible implementation of this embodiment, the data collection response message comprises of a simple ACK/NACK command indicating whether the network control entity either grants or rejects the data collection configuration suggested by the RAN node. In another implementation of this embodiment, the data collection response message can further comprise a modified (or new) data collection configuration determined by the network control entity for the RAN node. An ACK command, can be either transmitted separately or together with the modified (or new) data collection configuration. In this case, the ACK command would indicate a grant to initiate a data collection procedure but would be associated to the modified data collection configuration determined by the network control entity.

The preferred data collection configuration determined by the RAN node can be an MDT configuration as specified by LTE or a variant thereof.

In a particular embodiment, the RAN node may transmit to a network control entity, a data collection request message associated with a second RAN node. In this manner, the RAN node may assist the second RAN node in starting a data collection procedure. The difference here is that the information comprised within the data collection request message is associated to a second RAN node, including:

A request to initialize or start a data collection procedure at the second network node;
A request for a data collection configuration for the second network node;
A set of configuration requirements/parameters for data collection for the second RAN node, wherein said set of configuration requirements/parameters for data collection can be determined by the RAN node or by the second RAN node (and transmitted to the RAN node); and/or
A (preferred) data collection configuration for the second RAN node, wherein said data collection configuration can be determined by the RAN node or by the second RAN node (and transmitted to the RAN node).

Similarly, embodiments associated to the data collection response message transmitted by the network control entity apply mutatis mutandis to this embodiment with the exception that the information comprised within the data collection response message is associated to the second RAN node.

According to certain embodiments, a method is provided which is executed by a network control entity such as Element manager (EM), AMF, MME, OAM, or Management Function. The method includes receiving a data collection request message from a radio network node;

determining the data collection configuration setup based on the data collection request message;

e.g., MDT configurations are included in the data collection configuration transmitting a data collection response message to the RAN node(s).

The embodiments described above as relating to the radio network node may be equally applicable to the method by the network control entity.

Embodiments described above with respect to the radio network node are equally applicable here. The data collection response message may comprise one or more of:

An ACK/NACK command associated to starting data collection at the RAN node;

A data collection configuration for the RAN node, such as an MDT configuration;

A modified data collection configuration for the RAN node.

In the first case, the network control entity grants or rejects the request to start a data collection configuration received from a RAN node. The ACK/NACK command may further be associated to a data collection configuration received from the RAN node. In this case, the network control entity would grant or reject the data collection configuration suggested by the RAN node without any change.

In addition to that, as described in the second case, the network control entity may further transmit a data collection configuration to the RAN node. Such data collection configuration could be either:

A modification of a data collection configuration received by a RAN node. In this case the network control entity may change the configuration suggested by the RAN node according to data collection measurements and requirements that the network control entity has determined;

A new data collection configuration as planned by the network control entity (e.g., in response to a request to start a data collection campaign by the RAN node).

Figure 4:
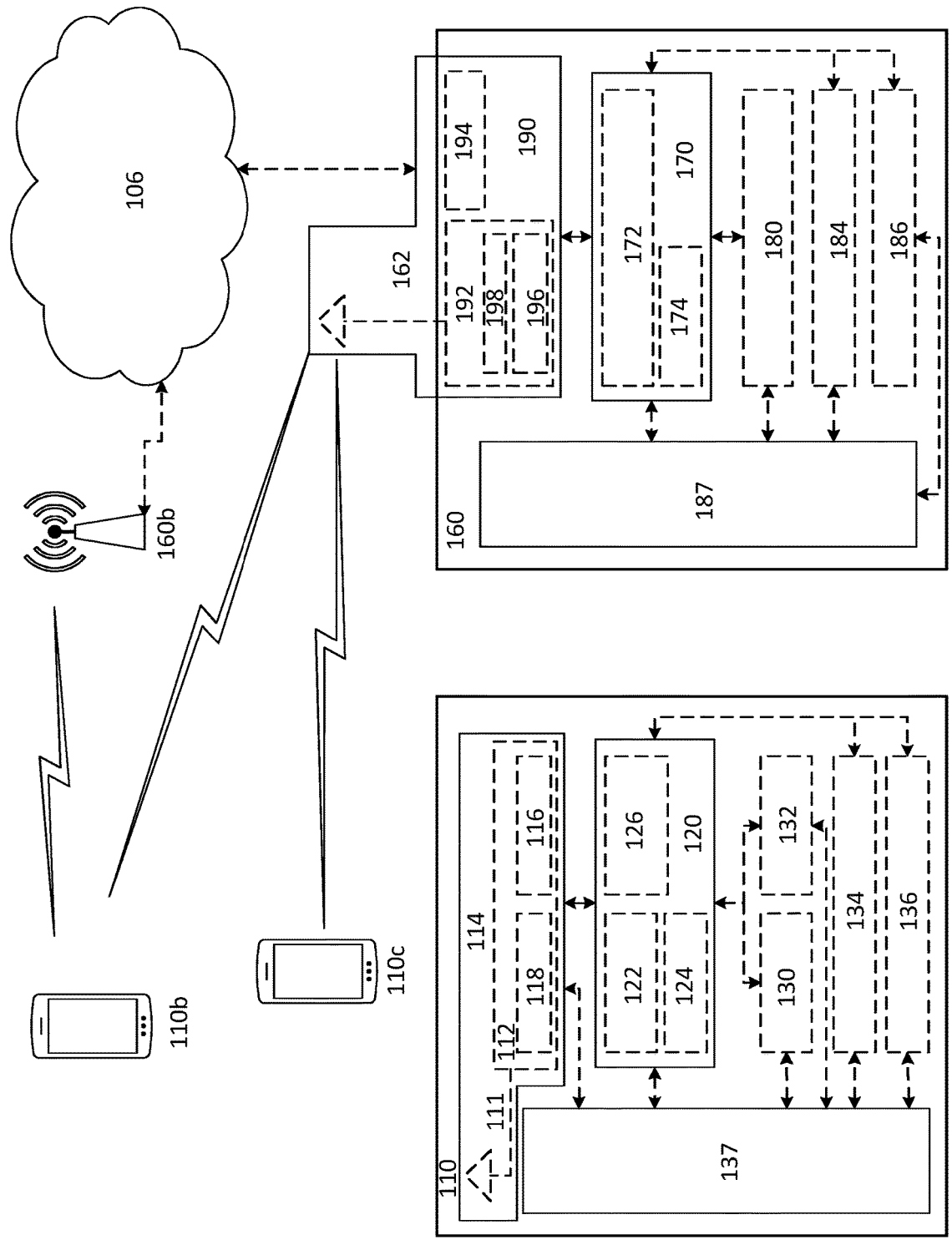
FIG. 4 illustrates an example wireless network, in accordance with certain embodiments.

FIG. 4 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 5:
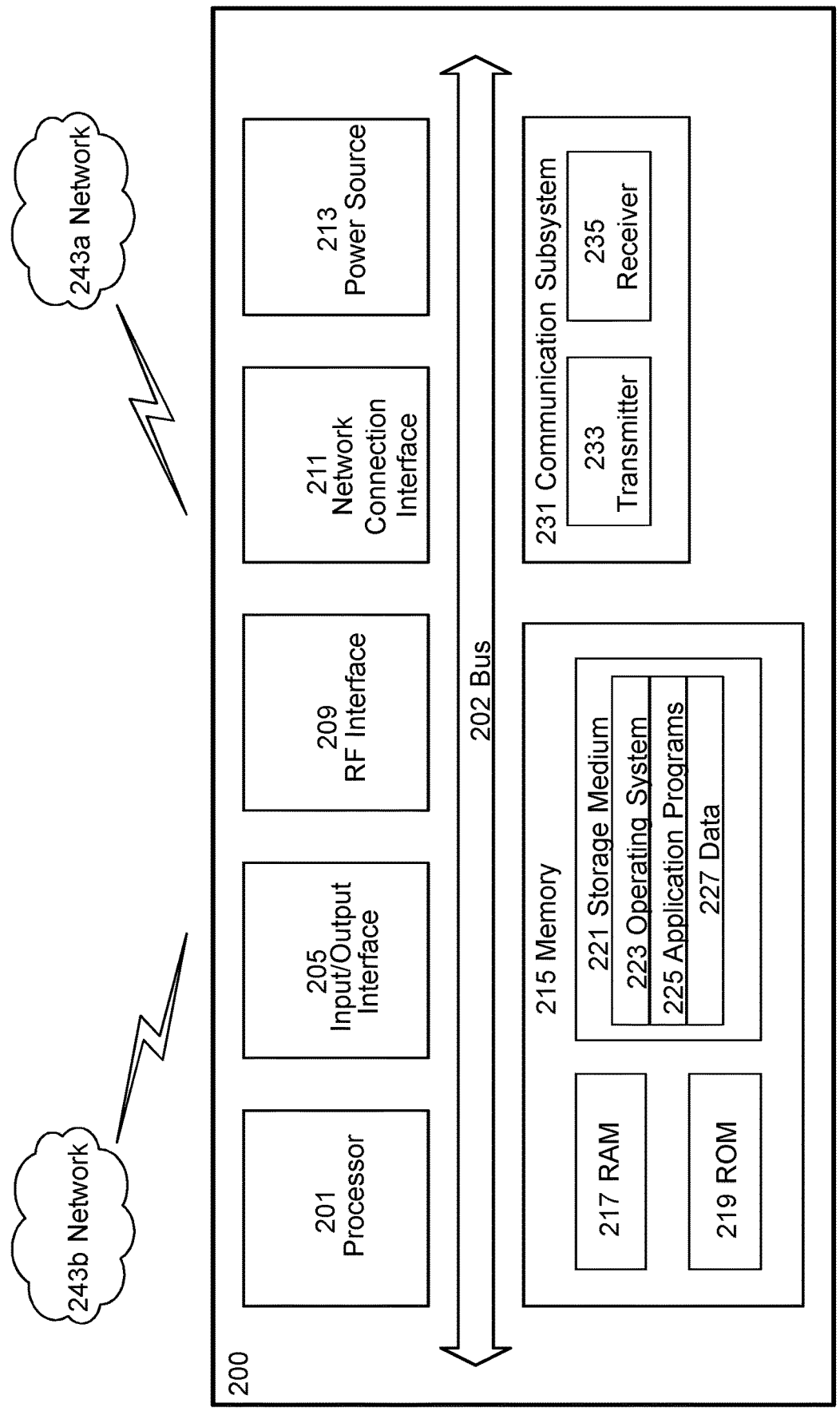
FIG. 5 illustrates an example user equipment, in accordance with certain embodiments.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 5, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeably. Accordingly, although FIG. 5 is a UE, the components discussed herein are equally applicable to a WD, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 6:
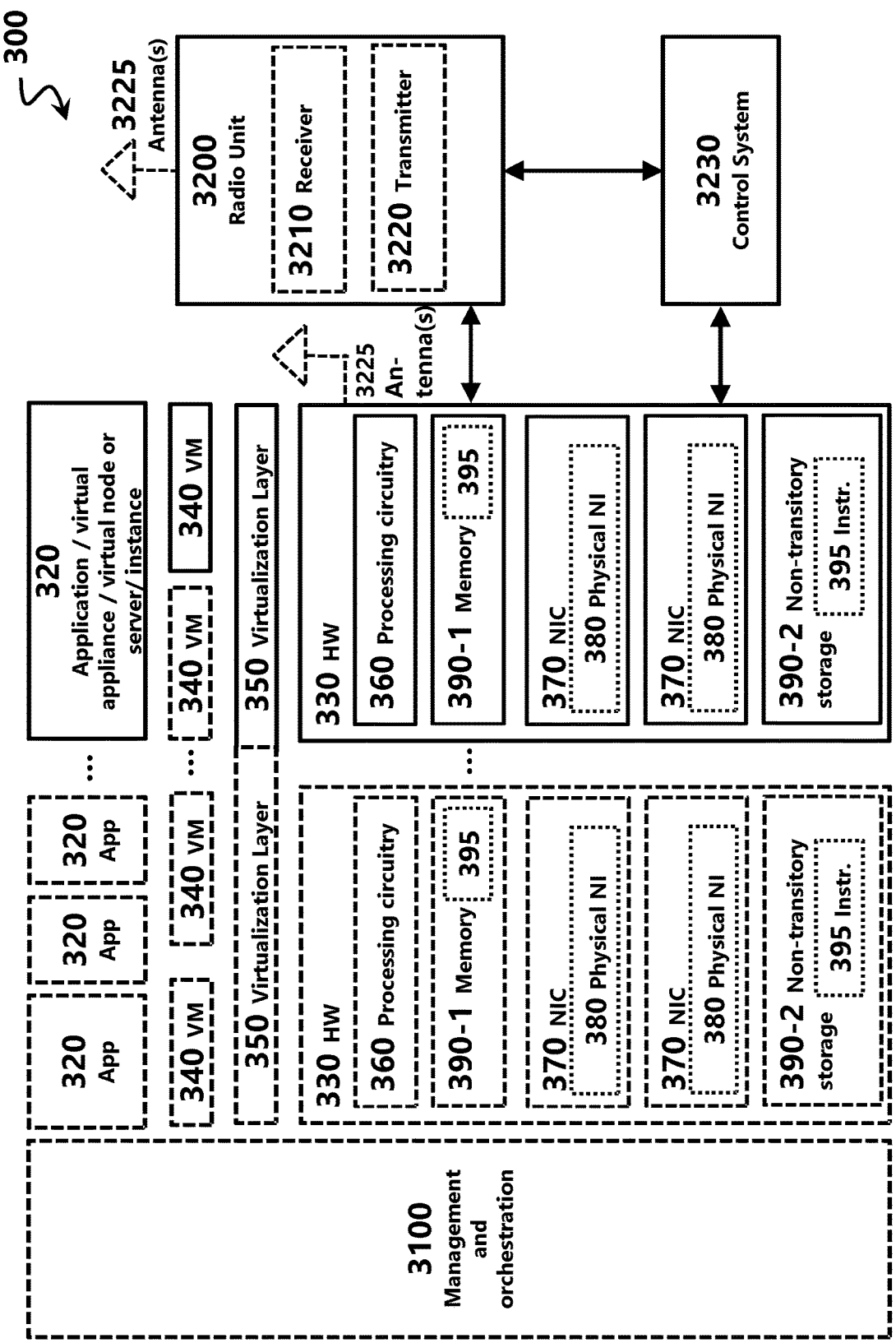
FIG. 6 illustrates an example virtualization environment, in accordance with certain embodiments.

FIG. 6 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 6, hardware 330 may be a standalone network node with generic or specific components. Hardware 330 may comprise antenna 3225 and may implement some functions via virtualization. Alternatively, hardware 330 may be part of a larger cluster of hardware (e.g., such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 6.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 7:
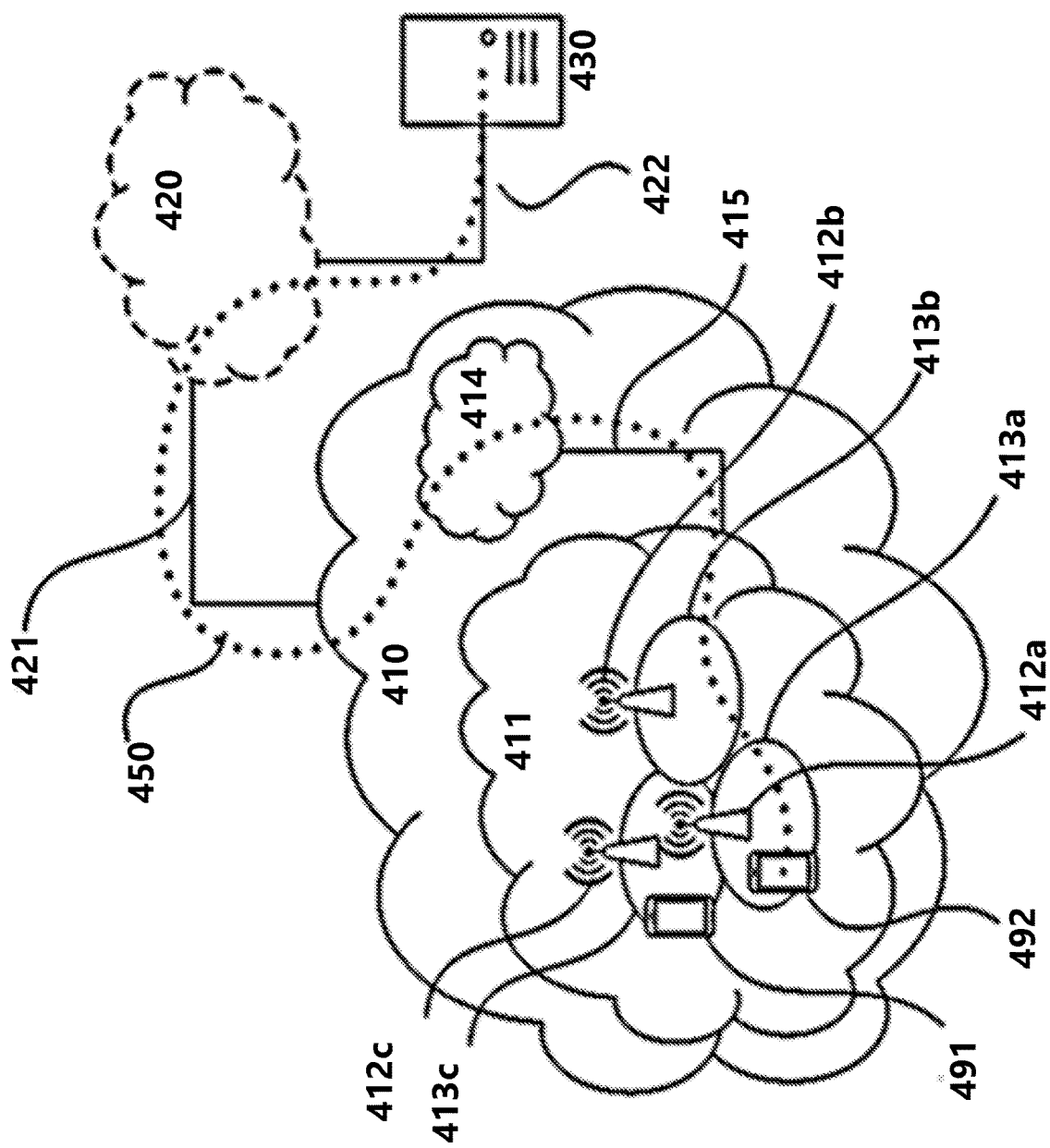
FIG. 7 illustrate an example telecommunication network connected via an intermediate network to a host computer, in accordance with certain embodiments.

FIG. 7 illustrates a telecommunication network connected via an intermediate network to a host computer in accordance with some embodiments.

With reference to FIG. 7, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 7 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 8:
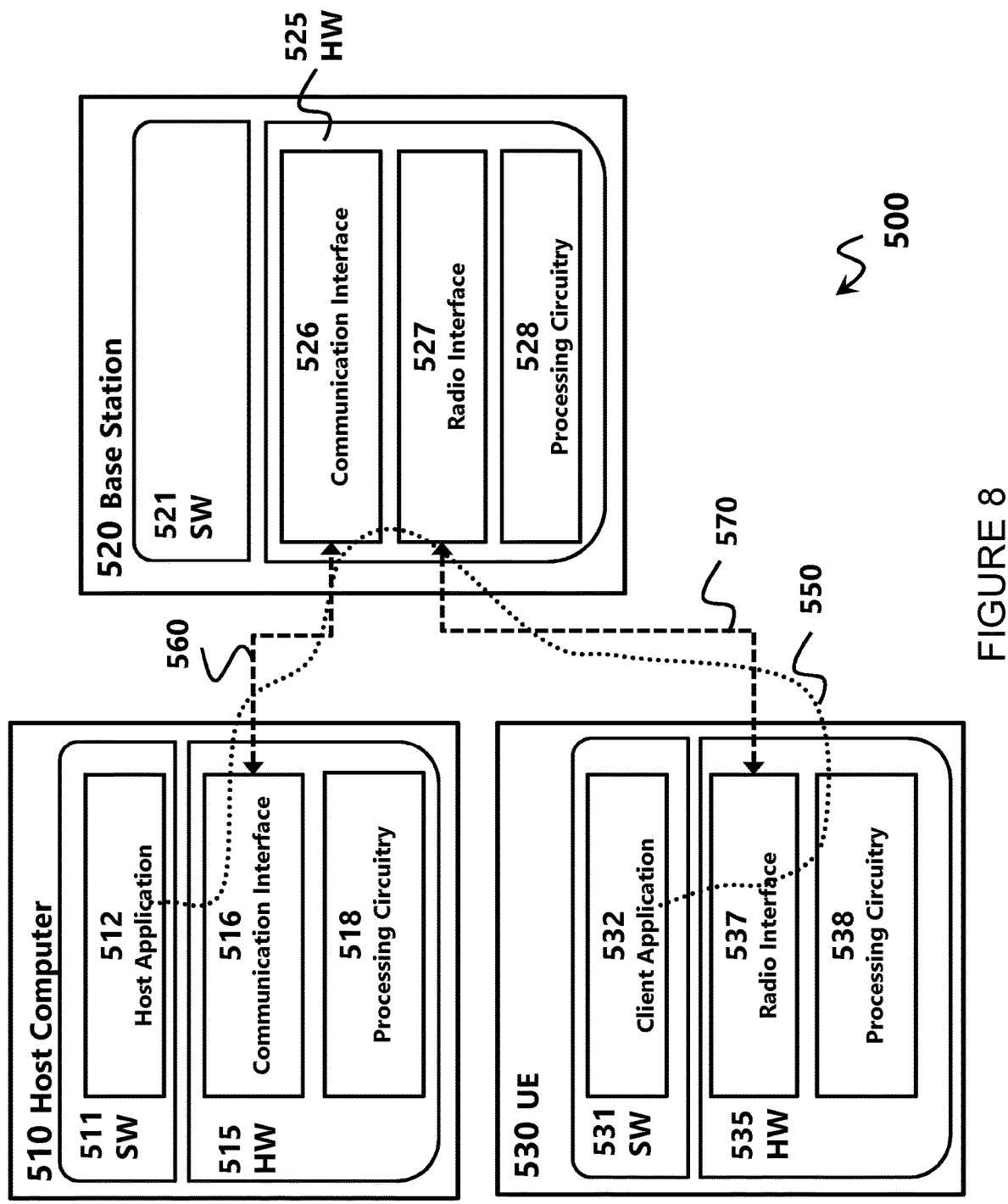
FIG. 8 illustrates an example host computer communicating via a base station with a user equipment over a partially wireless connection, in accordance with certain embodiments.

FIG. 8 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 8. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 8) served by base station 520. Communication interface 526 may be configured to facilitate connection 560 to host computer 510. Connection 560 may be direct or it may pass through a core network (not shown in FIG. 8) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 8 may be similar or identical to host computer 430, one of base stations 412a, 412b, 412c and one of UEs 491, 492 of FIG. 7, respectively. This is to say, the inner workings of these entities may be as shown in FIG. 8 and independently, the surrounding network topology may be that of FIG. 7.

In FIG. 8, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 9:
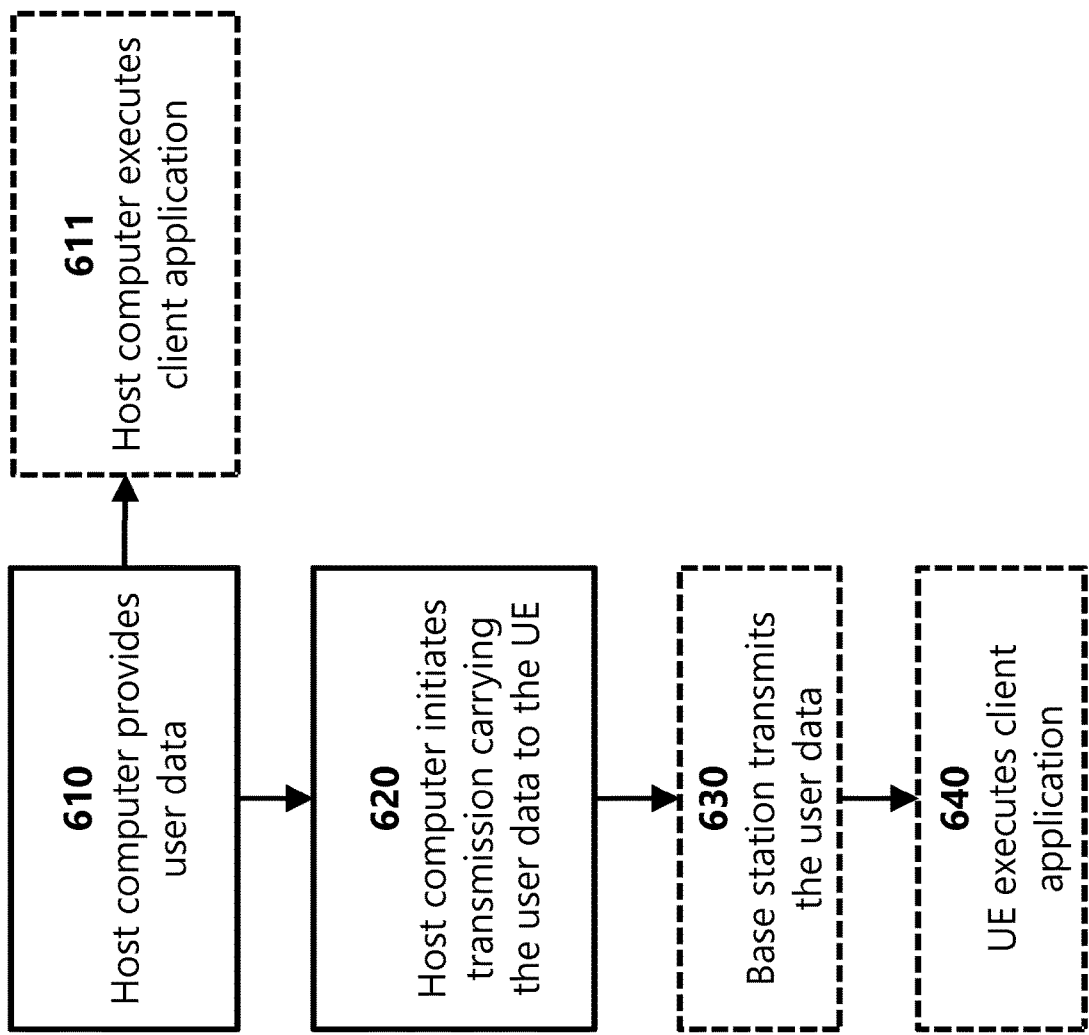
FIG. 9 is a flowchart illustrating an example method implemented in a communication system, in accordance certain embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 10:
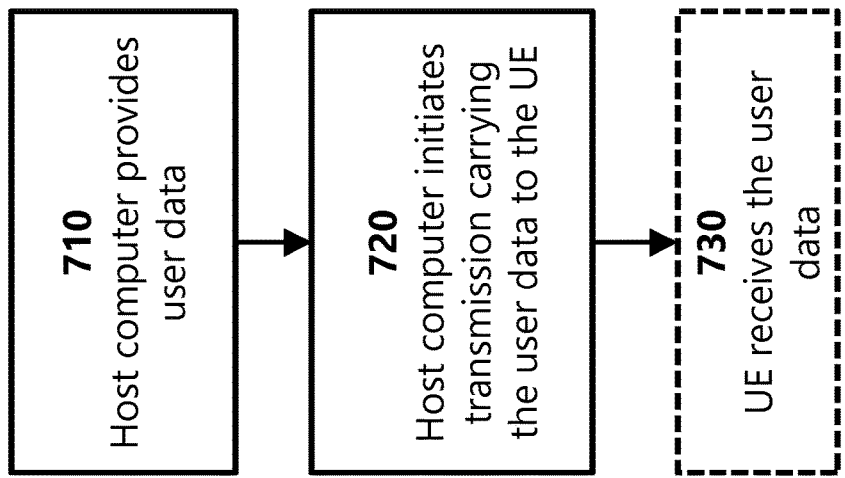
FIG. 10 is a flowchart illustrating a second example method implemented in a communication system, in accordance with certain embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 11:
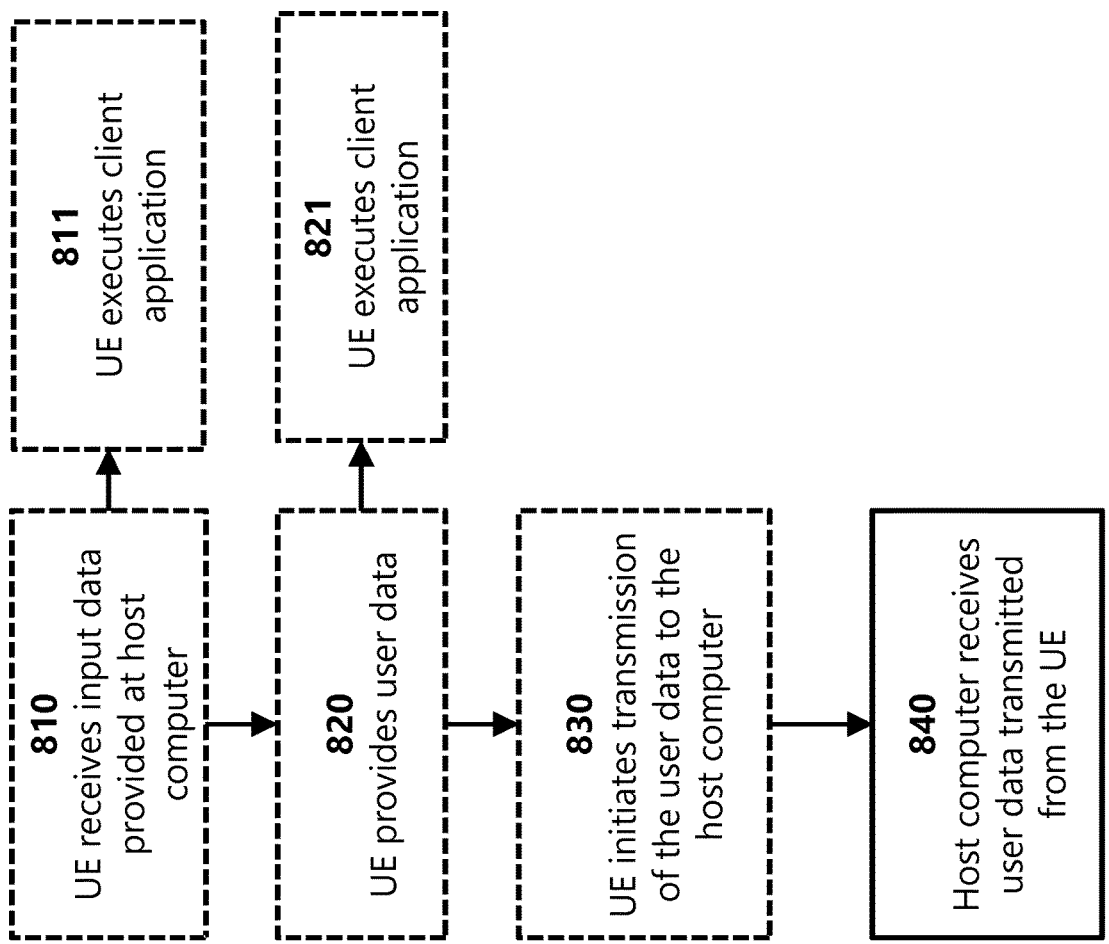
FIG. 11 is a flowchart illustrating a third method implemented in a communication system, in accordance with certain embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 12:
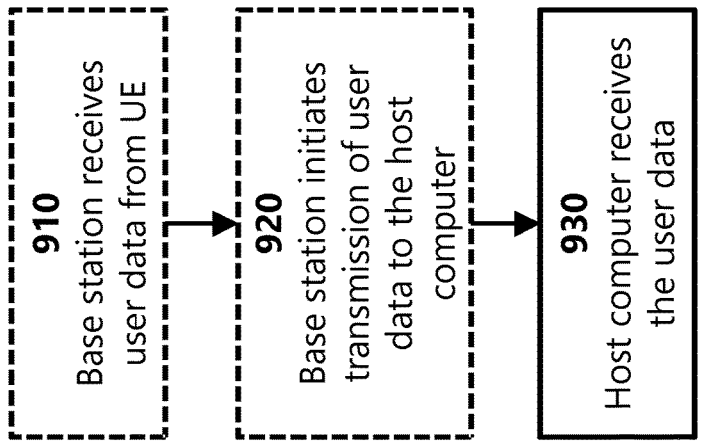
FIG. 12 is a flowchart illustrating a fourth method implemented in a communication system, in accordance with certain embodiments.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 13:
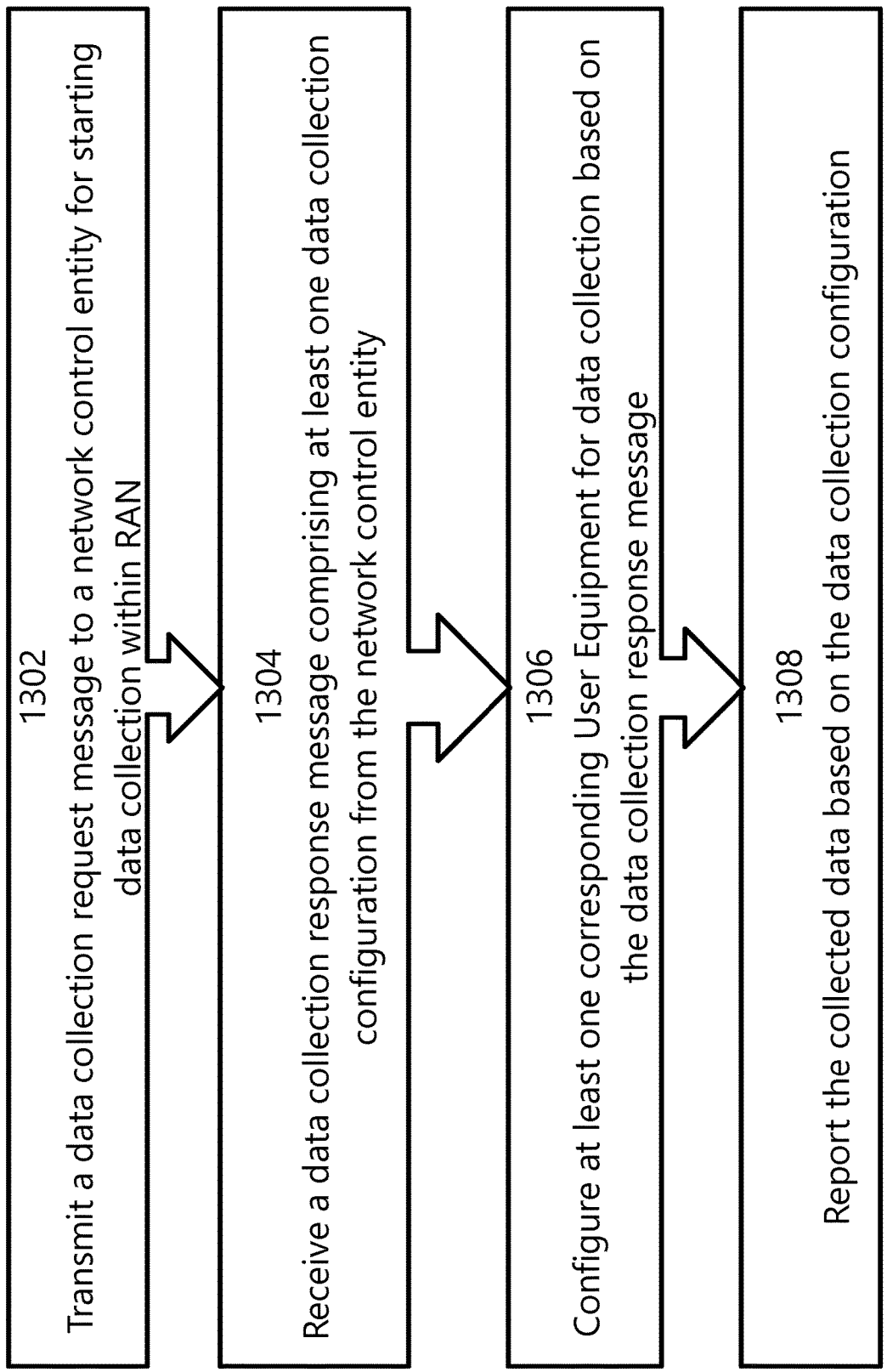
FIG. 13 illustrates an example of a method by a RAN node, in accordance with certain embodiments.

FIG. 13 depicts a method by a RAN node, according to certain embodiments. At step 1302, the RAN node transmits a data collection request message to a network control entity for starting data collection within the RAN. At step 1304, the RAN node receives a data collection response message comprising at least one data collection configuration from the network control entity. At step 1306, the RAN node configures at least one corresponding User Equipment for data collection based on the data collection response message. The RAN node reports the collected data based on the data collection configuration, at step 1208.

Figure 14:
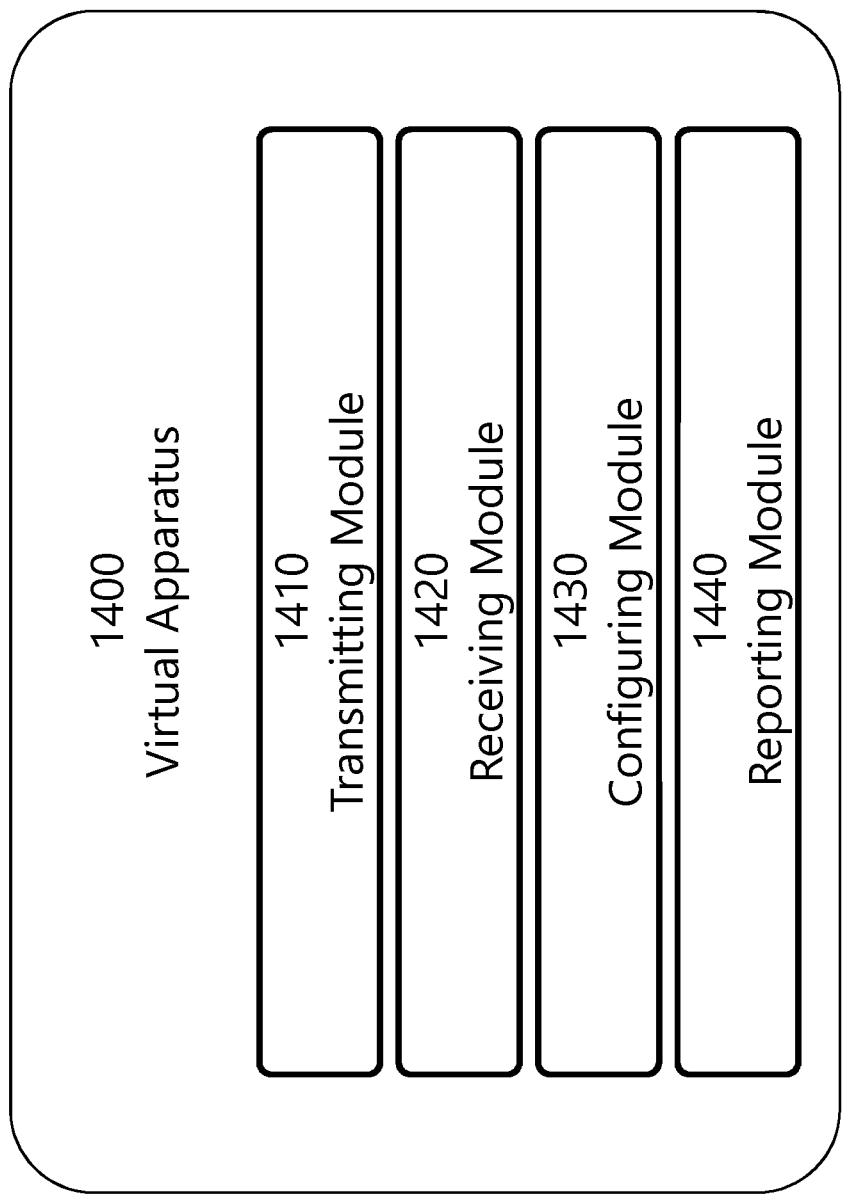
FIG. 14 illustrates an example schematic block diagram of a virtual apparatus in a wireless network, in accordance with certain embodiments.

FIG. 14 illustrates a schematic block diagram of a virtual apparatus 1400 in a wireless network (for example, the wireless network shown in FIG. 4). The apparatus may be implemented in a wireless device or network node (e.g., wireless device 110 or network node 160 shown in FIG. 4). Apparatus 1400 is operable to carry out the example method described with reference to FIG. 13 and possibly any other processes or methods disclosed herein. It is also to be understood that the method of FIG. 13 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1410, receiving module 1420, configuring module 1430, reporting module 1440, and any other suitable units of apparatus 1400 to perform corresponding functions according one or more embodiments of the present disclosure.

According to certain embodiments, transmitting module 1410 may perform certain of the transmitting functions of the apparatus 1400. For example, transmitting module 1410 may transmit a data collection request message to a network control entity for starting data collection within RAN.

According to certain embodiments, receiving module 1420 may perform certain of the receiving functions of the apparatus 1400. For example, receiving module 1420 may receive a data collection response message comprising at least one data collection configuration from the network control entity.

According to certain embodiments, configuring module 1430 may perform certain of the configuring functions of the apparatus 1400. For example, configuring module 1430 may configure at least one corresponding User Equipment for data collection based on the data collection response message.

According to certain embodiments, reporting module 1440 may perform certain of the reporting functions of the apparatus 1400. For example, reporting module 1430 may report the collected data based on the data collection configuration.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 15:
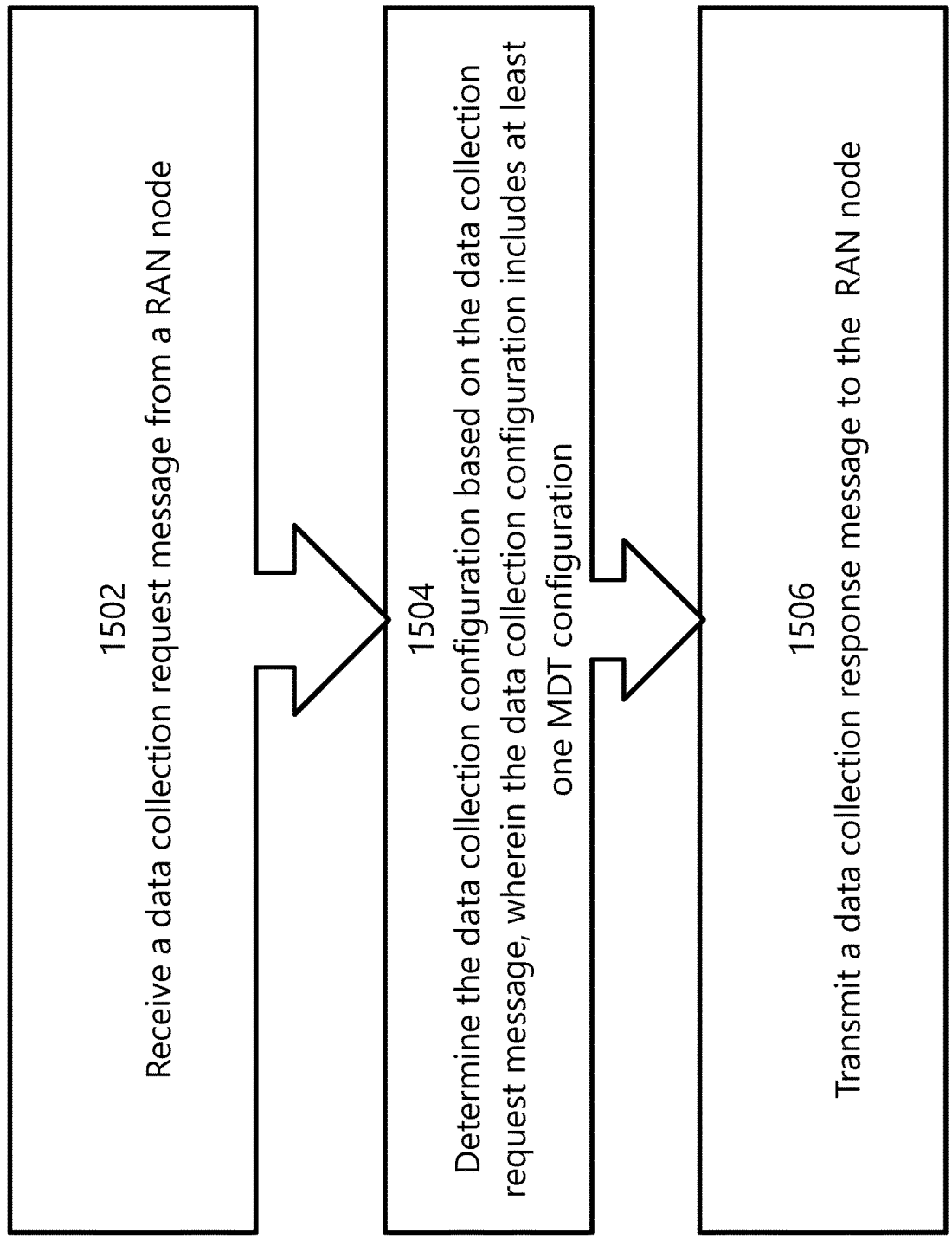
FIG. 15 illustrates an example of a method by a network control entity, in accordance with certain embodiments.

FIG. 15 depicts a method by a network control entity, according to certain embodiments. The method begins at step 1502, when the network control entity receives a data collection request message from a RAN node. At step 1504, the network control entity determines the data collection configuration based on the data collection request message. The data collection configuration includes at least one MDT configuration. At step 1506, the network control entity transmits a data collection response message to the RAN node.

Figure 16:
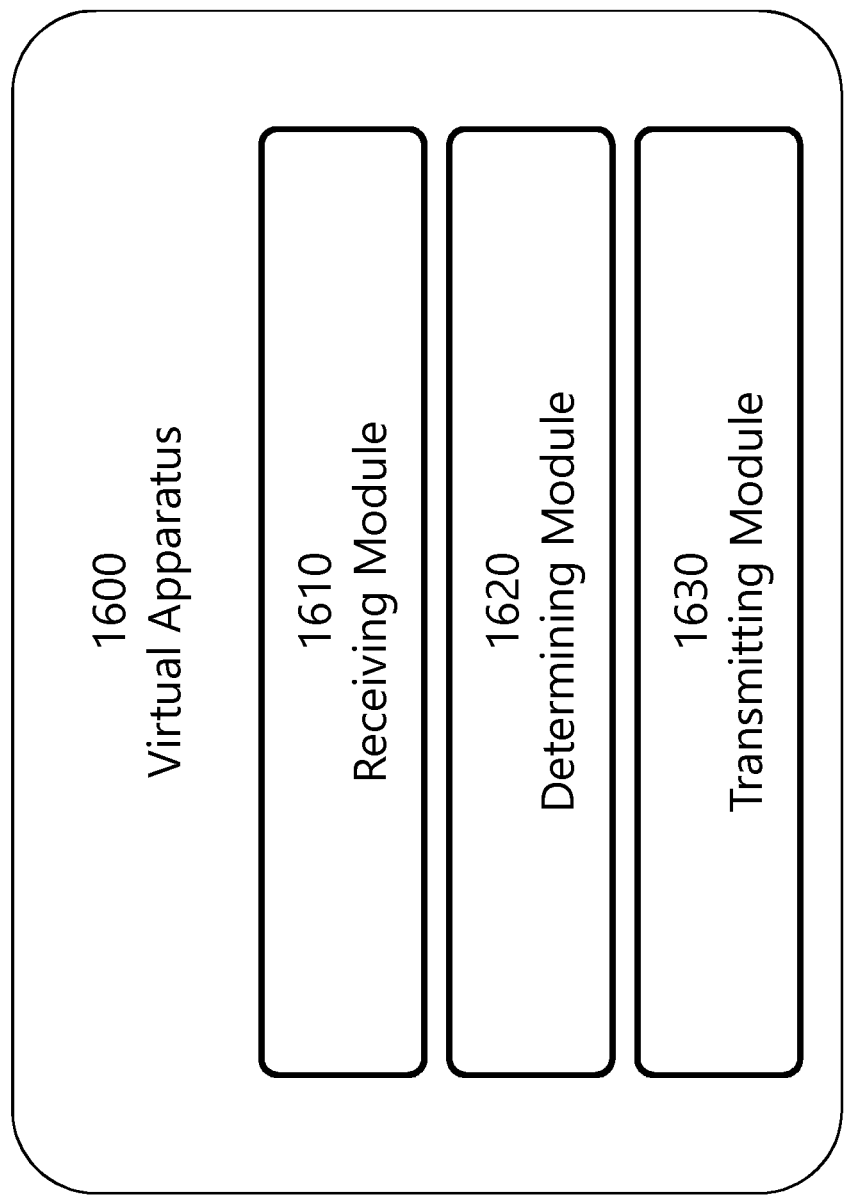
FIG. 16 illustrates an example schematic block diagram of a virtual apparatus in a wireless network, in accordance with certain embodiments.

FIG. 16 illustrates a schematic block diagram of a virtual apparatus 1600 in a wireless network (for example, the wireless network shown in FIG. 4). The apparatus may be implemented in a wireless device or network node (e.g., wireless device 110 or network node 160 shown in FIG. 4). Apparatus 1600 is operable to carry out the example method described with reference to FIG. 15 and possibly any other processes or methods disclosed herein. It is also to be understood that the method of FIG. 15 is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1610, determining module 1620, transmitting module 1630, and any other suitable units of apparatus 1600 to perform corresponding functions according one or more embodiments of the present disclosure.

According to certain embodiments, receiving module 1610 may perform certain of the receiving functions of the apparatus 1600. For example, receiving module 1610 may receive a data collection request message from a RAN node.

According to certain embodiments, determining module 1620 may perform certain of the determining functions of the apparatus 1600. For example, determining module 1620 may determine the data collection configuration based on the data collection request message. The data collection configuration includes at least one 16DT configuration.

According to certain embodiments, transmitting module 1630 may perform certain of the transmitting functions of the apparatus 1600. For example, transmitting module 1630 may transmit a data collection response message to the RAN node.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Embodiments

Group B1 Embodiments

1. A method performed by a Radio Access Network (RAN) node, the method comprising:
    transmitting a data collection request message to a network control entity for starting data collection within RAN;
    receiving a data collection response message comprising at least one data collection configuration from the network control entity;
    configuring at least one corresponding User Equipment for data collection based on the data collection response message; and
    reporting the collected data based on the data collection configuration.
2. The method of Embodiment 1, further comprising determining a set of requirements for data collection, wherein the set of requirements include at least one of:

a specific UE, a group of UEs or type of UEs that the RAN node wants to configure data collection to a request to get UE consent, the area that the radio network node wants to configure data collection, where an area can be defined in terms of coverage area of downlink.

a starting time, duration, periodicity, and/or repetition pattern of data collection.

3. The method of any one of Embodiments 1 to 2, further comprising determining a data collection configuration, and wherein the data collection request message comprises the data collection configuration 4. The method of Embodiment 3, wherein the data collection response message comprises an acknowledgment or negative acknowledgment indicating whether the network control entity approved or rejected the data collection configuration.

5. The method of any one of Embodiments 1 to 4, wherein the data collection response message is an acknowledgement indicating that the network control entity approved the data collection configuration and the method further comprises transmitting a data collection configuration message to at least one UE to initialize data measurements and reporting.

6. The method of Embodiment 5, wherein the data collection configuration message comprises at least one of:
   A starting time for data collection;
   An ending time for data collection;
   A time window for radio measurements
   A periodicity for radio measurements for data collection; and
   A condition for starting or terminating data collection.

7. The method of Embodiment 5, further comprising receiving data from the at least one corresponding UE.

8. The method of Embodiment 7, further comprising forwarding the data received from the at least one corresponding UE to the network control entity.

Group B2 Embodiments

9. A method performed by a network control entity, the method comprising:
   receiving a data collection request message from a RAN node;
   determining the data collection configuration based on the data collection request message, wherein the data collection configuration includes at least one MDT configuration; and
   transiting a data collection response message to the RAN node.

10. The method of Embodiment 9, further comprising determining a set of requirements for data collection, wherein the set of requirements include at least one of:
    a specific UE, a group of UEs or type of UEs that the RAN node wants to configure data collection to
    a request to get UE consent, the area that the radio network node wants to configure data collection, where an area can be defined in terms of coverage area of downlink.
    a starting time, duration, periodicity, and/or repetition pattern of data collection.

11. The method of any one of Embodiments 9 to 10, further comprising determining a data collection configuration, and wherein the data collection request message comprises the data collection configuration 12. The method of any one of Embodiments 9 to 11, wherein the data collection response message comprises an acknowledgment or negative acknowledgment indicating whether the network control entity approved or rejected the data collection configuration.

13. The method of any one of Embodiments 9 to 11, wherein the data collection response message comprises a data collection configuration for the RAN node.

14. The method of Embodiment 13, wherein the data collection configuration comprises a modification of a data collection configuration received by the RAN node.

15. The method of Embodiment 13, wherein the data collection configuration comprises a new data collection configuration as planned by the network control entity.

16. The method of any one of Embodiments 9 to 15, wherein the network control entity comprises an EM, AMF, MME, or Management Function.

Group C Embodiments

17. A base station for improving network efficiency, the base station comprising:
    processing circuitry configured to perform any of the steps of any of the Group B1 and B2 embodiments;
    power supply circuitry configured to supply power to the base station.

18. A communication system including a host computer comprising:
    processing circuitry configured to provide user data; and
    a communication interface configured to forward the user data to a cellular network for transmission to a user equipment (UE),
    wherein the cellular network comprises a base station having a radio interface and processing circuitry, the base station's processing circuitry configured to perform any of the steps of any of the Group B1 and B2 embodiments.

19. The communication system of the previous embodiment further including the base station.

20. The communication system of the previous 2 embodiments, further including the UE, wherein the UE is configured to communicate with the base station.

21. The communication system of the previous 3 embodiments, wherein:
    the processing circuitry of the host computer is configured to execute a host application, thereby providing the user data; and
    the UE comprises processing circuitry configured to execute a client application associated with the host application.

22. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs any of the steps of any of the Group B1 and B2 embodiments.

23. The method of the previous embodiment, further comprising, at the base station, transmitting the user data.

24. The method of the previous 2 embodiments, wherein the user data is provided at the host computer by executing a host application, the method further comprising, at the UE, executing a client application associated with the host application.

25. A user equipment (UE) configured to communicate with a base station, the UE comprising a radio interface and processing circuitry configured to performs the of the previous 3 embodiments.

26. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B1 and B2 embodiments.

27. The communication system of the previous embodiment further including the base station.

28. The communication system of the previous 2 embodiments, further including the UE, wherein the UE is configured to communicate with the base station.

29. The communication system of the previous 3 embodiments, wherein:
    the processing circuitry of the host computer is configured to execute a host application;
    the UE is configured to execute a client application associated with the host application, thereby providing the user data to be received by the host computer.

Figure 17:
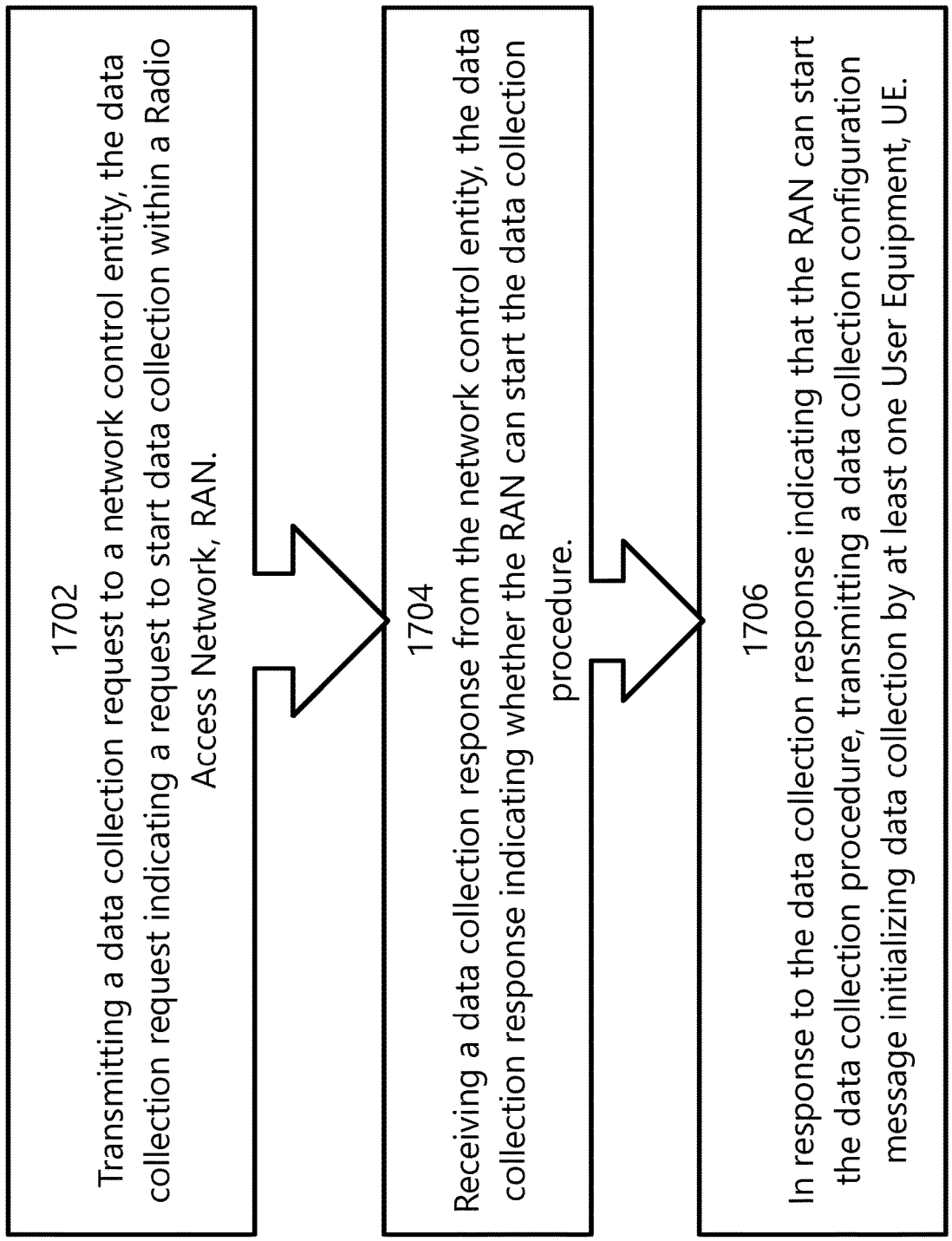
FIG. 17 illustrates an example of a method by a RAN node, in accordance with certain embodiments.

FIG. 17 illustrates an example of a method by a RAN node, in accordance with certain embodiments. In certain embodiments, the method may be performed by a network node in the RAN, such as RAN node 20 described above with respect to any of FIGS. 1-3. RAN node may include any suitable circuitry of a network node, such as processing circuitry 170, power circuitry 187, or other circuitry described above for network node 160.

The method illustrated in FIG. 17 begins at step 1702 with transmitting a data collection request to a network control entity. The data collection request indicates a request to start data collection within a RAN (e.g., a RAN of the RAN node, or a second RAN). Examples of the data collection request are described above with respect to FIG. 1 (message 2), FIG. 2 (message 2), and FIG. 3 (message 2).

The method proceeds to step 1704 with receiving a data collection response from the network control entity. The data collection response indicates whether the RAN can start the data collection procedure. Examples of the data collection response are described above with respect to FIG. 1 (message 3), FIG. 2 (message 4), and FIG. 3 (message 4). In certain embodiments, the data collection response comprises either an ACK (indicating that the RAN can start the data collection procedure) or a NACK (indicating that the RAN cannot start the data collection procedure). In certain embodiments, the data collection response comprises a data collection configuration (such as an MDT configuration). Thus, depending on the embodiment, the data collection response may comprise only an ACK/NACK (without any data collection configuration), only a data collection configuration (without any ACK/NACK), or both an ACK/NACK and a data collection configuration.

In response to the data collection response indicating that the RAN can start the data collection procedure, the method proceeds to step 1706 with transmitting a data collection configuration message initializing data collection by at least one UE. Examples of the data collection configuration message are described above with respect to FIG. 1 (message 4), FIG. 2 (message 5), and FIG. 3 (message 5). In certain embodiments, the data collection configuration message is an MDT configuration message. In certain embodiments, the data collection configuration message comprises a data collection configuration to be used by the UE performing the data collection procedure. For example, the data collection configuration may include one or more of: a starting time for data collection, an ending time for data collection, a time window for radio measurements, a periodicity for radio measurements for data collection, a condition for starting or terminating data collection, and/or one or more types of measurements to be collected.

In certain embodiments, the messages exchanged in steps 1702 and 1704 may be used in configuring the data collection configuration. As an example, the data collection request that the RAN node transmits in step 1702 may include a request for the network control entity to provide a data collection configuration. If the network control entity determines to allow the data collection within a RAN, the network control entity may provide the data collection configuration to the RAN node. In some embodiments, the network control entity may include the data collection configuration in the data collection response that the RAN node receives in step 1704. In other embodiments, the network control entity may include an ACK in the data collection response that the RAN node receives in step 1704, and the RAN node receives the data collection configuration in dedicated signaling from the network control entity following the data collection response of step 1704.

In certain embodiments, the RAN node may provide the network control entity with data collection preferences determined by the RAN node. Each data collection preference comprises a configuration requirement and/or a parameter configuration that the RAN node prefers to use for the data collection within the RAN. Examples of data collection preferences may include one or more of: a specific UE, a group of UEs, or a type of UE for which the RAN node requests to configure data collection; a specific UE, a group of UEs, or a type of UE for which the RAN node requests UE consent for configuring data collection; one or more geographical areas for which the radio network node requests to configure data collection (wherein a geographical location may be defined in terms of the coverage area of downlink signals of a radio network node); a starting time, duration, periodicity, and/or repetition pattern of data collection; and/or one or more types of measurements to be collected. In certain embodiments, groups of UEs may be determined based on characteristics such as the status or capabilities of the UE. Examples may include whether the UE is in RRC connected mode or RRC idle mode, whether the UE is transmitting/receiving (or is capable of transmitting/receiving) a given type of traffic (e.g., V2X, URLLC, MBB, etc.), whether the UE is registered with a certain network slice, whether the UE fulfills certain mobility criteria (e.g., speed above or below a given threshold), etc. In certain embodiments, the RAN node includes the one or more data collection preferences in the data collection request of step 1702. The preferences may be included in the message directly or through an indicator from which the network control entity can determine the preferences (such as by mapping the indicator to stored preferences). The network control entity may then determine a data collection configuration based on the preferences of the RAN node. FIG. 2 illustrates an example (see e.g., step 3).

In certain embodiments, the RAN node determines a data collection configuration that the RAN node prefers to use for the data collection within the RAN. For example, the data collection request transmitted in step 1702 may indicate the data collection configuration that the RAN node prefers to use for the data collection within the RAN. The data collection request may include the proposed data collection configuration (e.g., a starting time for data collection, an ending time for data collection, one or more types of measurements to be collected, etc.). Or, the data collection request may include a policy, index, or other indicator from which the network control entity can determine the proposed data collection configuration (such as by mapping the indicator to a stored data collection configuration). If the network control entity accepts the proposed data collection configuration, the data collection response may comprise an ACK in step 1704. The ACK indicates that the RAN node can start the data collection procedure according to the data collection configuration indicated in the data collection request. Alternatively, if the network control entity does not accept the data collection configuration as proposed, the data collection response received in step 1704 may include a new or modified data collection configuration. This indicates that the RAN node can start the data collection procedure according to the new or modified data collection configuration (see e.g., FIG. 3, step 3). The data collection response in step 1704 may include a NACK, which indicates that the network control entity has rejected the data collection configuration requested in step 1702.

In this manner, the data collection configuration message transmitted to the UE in step 1706 can initialize data collection by the at least one UE according to the data collection configuration received from (or acknowledged by) the network control entity.

After transmitting the data collection configuration message in step 1706, the RAN node may receive a data collection report from the at least one UE. Examples of receiving the data collection report are described above with respect to FIG. 1 (message 5), FIG. 2 (message 6), and FIG. 3 (message 6). Information received in the data collection report may be used in performing an internal operation of the RAN. In addition, or in the alternative, the RAN node may forward the data collection report to the network control entity. In certain embodiments, the data collection report that the RAN node forwards to the network control entity comprises information based on multiple data collection reports from the same UE or from multiple UEs.

Figure 18:
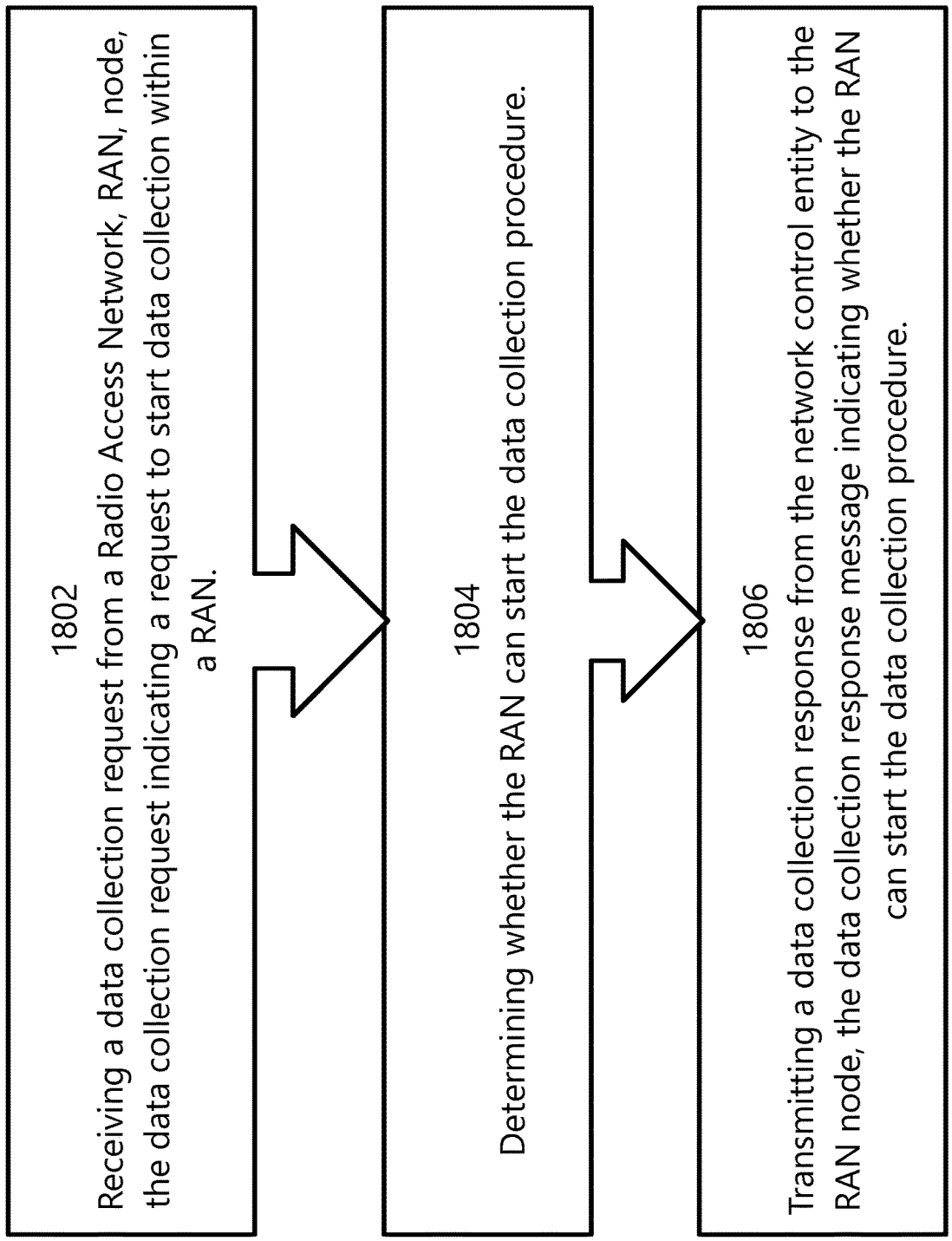
FIG. 18 illustrates an example of a method by a network control entity, in accordance with certain embodiments.

FIG. 18 illustrates an example of a method by a network control entity, in accordance with certain embodiments. In certain embodiments, the method may be performed by a network control entity, such as network control entity 10 described above with respect to any of FIGS. 1-3. A network control entity may include any suitable circuitry of a network node, such as circuitry similar to the processing circuitry 170 and power circuitry 187 described above for network node 160, wherein the processing circuitry is configured to perform operations described herein as being performed by a network control entity. In general, the method described with respect to FIG. 18 may be performed by the network control entity in order to support or respond to a RAN node performing the method described with respect to FIG. 17. Thus, FIG. 17 provides further context for FIG. 18, and vice versa.

The method begins at step 1802 with receiving a data collection request from a RAN node. The data collection request indicates a request to start data collection within a RAN (e.g., a RAN of the RAN node, or a second RAN). The method proceeds to step 1804 with determining whether the RAN can start the data collection procedure. The method proceeds to step 1806 with transmitting data collection response from the network control entity to the RAN node. The data collection response indicates whether the RAN can start the data collection procedure. In certain embodiments, the data collection response comprises either an ACK (indicating that the RAN can start the data collection procedure) or a NACK (indicating that the RAN cannot start the data collection procedure). In certain embodiments, the data collection response comprises a data collection configuration (such as an MDT configuration). Thus, depending on the embodiment, the data collection response may comprise only an ACK/NACK (without any data collection configuration), only a data collection configuration (without any ACK/NACK), or both an ACK/NACK and a data collection configuration.

As described with respect to FIG. 17, when the data collection response indicates that the RAN can start the data collection procedure, the data collection response (whether alone or together with subsequent dedicated signaling) may prompt the RAN node to transmit a data collection configuration message initializing data collection by at least one UE. In certain embodiments, the network control entity receives a data collection report that the RAN node has forwarded from the at least one UE. The network control entity may then perform an operation based on information received in the data collection report.

In certain embodiments, the messages exchanged in steps 1802 and 1804 may be used in configuring a data collection configuration, such as the data collection configuration to be used by the UE performing the data collection procedure. For example, the data collection configuration may include one or more of: a starting time for data collection, an ending time for data collection, a time window for radio measurements, a periodicity for radio measurements for data collection, a condition for starting or terminating data collection, and/or one or more types of measurements to be collected.

In certain embodiments, the data collection request received from the RAN node in step 1802 comprises a request for the network control entity to provide a data collection configuration. Optionally, the network control entity may receive one or more data collection preferences from the RAN node (such as preferences included in the data collection request). Each data collection preference comprises a configuration requirement and/or a parameter configuration that the RAN node prefers to use for the data collection within the RAN, such as a specific UE, a group of UEs, or a type of UE for which the RAN node requests to configure data collection; a specific UE, a group of UEs, or a type of UE for which the RAN node requests UE consent for configuring data collection; one or more geographical areas for which the radio network node requests to configure data collection; a starting time, duration, periodicity, and/or repetition pattern of data collection; and/or one or more types of measurements to be collected. The network control entity then determines a data collection configuration (e.g., taking into consideration preferences received from the RAN node, if any) and provides the data collection configuration to the RAN node. In some embodiments, the data collection configuration is provided in the data collection response of step 1804. In other embodiments, the data collection response of step 1804 comprises an ACK and the data collection configuration is provided to the RAN node in dedicated signaling following the data collection response.

In certain embodiments, the RAN node requests a data collection configuration that the RAN node prefers to use for the data collection within the RAN. For example, the data collection request received in step 1802 may indicate the data collection configuration that the RAN node prefers to use for the data collection within the RAN. The data collection request may include the proposed data collection configuration (e.g., a starting time for data collection, an ending time for data collection, one or more types of measurements to be collected, etc.). Or, the data collection request may include a policy, index, or other indicator from which the network control entity can determine the proposed data collection configuration (such as by mapping the indicator to a stored data collection configuration). The network control entity then determines whether to accept the data collection configuration that the RAN node prefers. If the network control entity accepts the proposed data collection configuration, the data collection response may comprise an ACK in step 1804. The ACK indicates that the RAN node can start the data collection procedure according to the data collection configuration indicated in the data collection request. Alternatively, if the network control entity does not accept the data collection configuration as proposed, the data collection response transmitted in step 1804 may include a new or modified data collection configuration. This indicates that the RAN node can start the data collection procedure according to the new or modified data collection. The data collection response in step 1804 may include a NACK, which indicates that the network control entity has rejected the data collection configuration requested in step 1802.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the following claims.

The invention claimed is:

1. A method performed by a Radio Access Network, RAN, node, the method comprising:
    transmitting a data collection request to a network control entity, the data collection request indicating a request to start data collection within a Radio Access Network, RAN;
    receiving a data collection response from the network control entity, the data collection response indicating whether the RAN can start the data collection procedure; and
    in response to the data collection response indicating that the RAN can start the data collection procedure, transmitting a data collection configuration message initializing data collection by at least one User Equipment, UE.

2. The method of claim 1, wherein the data collection response received from the network control entity comprises one of:
    an acknowledgement, ACK, the ACK indicating that the RAN can start the data collection procedure; or
    a negative acknowledgement, NACK, the NACK indicating that the RAN cannot start the data collection procedure.

3. The method of claim 1, wherein the data collection configuration message initializing data collection by the at least one UE is a Minimization of Drive Test, MDT, configuration message.

4. The method of claim 1, wherein the data collection configuration message initializing data collection by the at least one UE comprises a data collection configuration.

5. The method of claim 1, further comprising receiving a data collection report from the at least one UE.

6. The method of claim 5, further comprising performing an internal operation of the RAN based on information received in the data collection report.

7. The method of claim 5, further comprising forwarding the data collection report to the network control entity.

8. The method of claim 1, further comprising:
    including in the data collection request a request for the network control entity to provide a data collection configuration.

9. The method of claim 1, further comprising:
    receiving a data collection configuration from the network control entity.

10. The method of claim 9, wherein the data collection configuration is received in the data collection response from the network control entity.

11. The method of claim 9, wherein the data collection response comprises an Acknowledgement, ACK, and a data collection configuration, the data collection configuration received via dedicated signaling from the network control entity to the RAN node.

12. The method of claim 1, further comprising:
    determining one or more data collection preferences of the RAN node, wherein each data collection preference comprises at least one of a configuration requirement and a parameter configuration that the RAN node prefers to use for the data collection within the RAN; and
    including the one or more data collection preferences in the data collection request.

13. The method of claim 12, wherein the one or more data collection preferences comprise one or more of:
    a specific UE, a group of UEs, and a type of UE for which the RAN node requests to configure data collection;
    a specific UE, a group of UEs, and a type of UE for which the RAN node requests UE consent for configuring data collection;
    one or more geographical areas for which the radio network node requests to configure data collection;
    at least one of a starting time, duration, periodicity, and repetition pattern of data collection; and
    one or more types of measurements to be collected.

14. The method of claim 1, further comprising:
    determining a data collection configuration that the RAN node prefers to use for the data collection within the RAN; and
    wherein the data collection request indicates the data collection configuration that the RAN node prefers to use for the data collection within the RAN.

15. A Radio Access Network, RAN, node, the RAN node comprising:
    power supply circuitry configured to supply power to the RAN node; and
    processing circuitry configured to:
        transmit a data collection request to a network control entity, the data collection request indicating a request to start data collection within a Radio Access Network, RAN;

receive a data collection response from the network control entity, the data collection response indicating whether the RAN can start the data collection procedure; and in response to the data collection response indicating that the RAN can start the data collection procedure, transmit a data collection configuration message initializing data collection by at least one User Equipment, UE.

16. A method performed by a network control entity, the method comprising:

receiving a data collection request from a Radio Access Network, RAN, node, the data collection request indicating a request to start data collection within a RAN;

determining whether the RAN can start the data collection procedure; and transmitting a data collection response from the network control entity to the RAN node, the data collection response indicating whether the RAN can start the data collection procedure.

17. The method of claim 16, wherein the data collection response transmitted to the RAN node comprises one of:

an acknowledgement, ACK, the ACK indicating that the RAN can start the data collection procedure; or a negative acknowledgement, NACK, the NACK indicating that the RAN cannot start the data collection procedure.

18. The method of claim 16, further comprising:

receiving a data collection report that the RAN node has forwarded from at least one UE performing the data collection procedure; and performing an operation of the network control entity based on information received in the data collection report.

19. The method of claim 16, wherein the data collection request received from the RAN node comprises a request for the network control entity to provide a data collection configuration and the method further comprises:

determining a data collection configuration; and providing the data collection configuration to the RAN node.

20. A network control entity, the network control entity comprising:

power supply circuitry configured to supply power to the network control entity; and processing circuitry configured to:

receive a data collection request from a Radio Access Network, RAN, node, the data collection request indicating a request to start data collection within a RAN;

determine whether the RAN can start the data collection procedure; and transmit a data collection response from the network control entity to the RAN node, the data collection response indicating whether the RAN can start the data collection procedure.

* * * * *